(12) United States Patent
Goto et al.

(10) Patent No.: US 10,466,393 B2
(45) Date of Patent: Nov. 5, 2019

(54) DISPLAY DEVICE

(71) Applicant: DAI NIPPON PRINTING CO., LTD., Tokyo (JP)

(72) Inventors: Masahiro Goto, Tokyo (JP); Hiroshi Sekiguchi, Tokyo (JP); Yu Morioka, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/774,646

(22) PCT Filed: Sep. 30, 2016

(86) PCT No.: PCT/JP2016/079079
§ 371 (c)(1),
(2) Date: May 9, 2018

(87) PCT Pub. No.: WO2017/090315
PCT Pub. Date: Jun. 1, 2017

(65) Prior Publication Data
US 2018/0329122 A1  Nov. 15, 2018

(30) Foreign Application Priority Data

Nov. 27, 2015  (JP) ................................. 2015-231389

(51) Int. Cl.
*G02B 5/02* (2006.01)
*G02B 27/01* (2006.01)
(Continued)

(52) U.S. Cl.
CPC ............. *G02B 5/0278* (2013.01); *G02B 5/02* (2013.01); *G02B 5/0268* (2013.01);
(Continued)

(58) Field of Classification Search
CPC .... G02B 5/0278; G02B 27/0172; G02B 5/02; G02B 5/0268; G02B 5/0284;
(Continued)

(56) References Cited

U.S. PATENT DOCUMENTS

| 5,499,138 A | 3/1996 | Iba |
| 2010/0260455 A1 | 10/2010 | Pascal et al. |

FOREIGN PATENT DOCUMENTS

| EP | 3249444 A1 | 11/2017 |
| JP | H05-328261 A | 12/1993 |

(Continued)

OTHER PUBLICATIONS

Dec. 20, 2016 International Search Report issued in Patent Application No. PCT/JP2016/079079.

*Primary Examiner* — Ryan D Howard
(74) *Attorney, Agent, or Firm* — Oliff PLC

(57) ABSTRACT

A display device comprised by being provided with: an image source for emitting image light; a lens for enlarging the image light and emitting the image light to the viewer side; and an optical sheet disposed between the image source and the lens or on the viewer side of the lens, wherein the optical sheet comprises at least two or more layers, a plurality of convex shapes are formed at interfaces between the layers, a difference Δn in refractive index between the layers adjacent to each other satisfies 0.005≤Δn≤0.1, a half-value angle α of the optical sheet satisfies 0.05°≤α≤0.2°, and a diffusion angle β of the optical sheet at which a maximum brightness becomes ½₀ satisfies β≤5×α.

18 Claims, 21 Drawing Sheets

(51) Int. Cl.
*G02B 27/02* (2006.01)
*G09F 9/00* (2006.01)
*H01L 51/50* (2006.01)
*H04N 5/64* (2006.01)
*H05B 33/02* (2006.01)

(52) U.S. Cl.
CPC ....... *G02B 5/0284* (2013.01); *G02B 27/0172* (2013.01); *G02B 27/02* (2013.01); *G09F 9/00* (2013.01); *H01L 51/50* (2013.01); *H04N 5/64* (2013.01); *H05B 33/02* (2013.01); *G02B 2027/0118* (2013.01)

(58) Field of Classification Search
CPC .......... G02B 27/0101; G02B 2027/011; G02B 2027/0118
See application file for complete search history.

(56) References Cited

FOREIGN PATENT DOCUMENTS

| | | |
|---|---|---|
| JP | H07-110470 A | 4/1995 |
| JP | 2011-509417 A | 3/2011 |
| JP | 2012-255819 A | 12/2012 |
| JP | 2013-003272 A | 1/2013 |
| JP | 2013-003276 A | 1/2013 |
| JP | 2016-139112 A | 8/2016 | b-b CROSS SECTION c-c CROSS SECTION

FIG. 11

| | ARRANGEMENT PITCH P1,P2 [mm] | VERTEX ANGLE θ1,θ2 [DEGREE] | DIFFUSION ANGLE γ [DEGREE] | VISUAL EVALUATION |
|---|---|---|---|---|
| EXAMPLE 1 | 0.2 | 177 | 0.058 | ○ |
| EXAMPLE 2 | 0.2 | 175 | 0.120 | ◎ |
| EXAMPLE 3 | 0.2 | 171 | 0.175 | ○ |
| COMPARATIVE EXAMPLE 1 | 0.2 | 178 | 0.039 | × |
| COMPARATIVE EXAMPLE 2 | 0.2 | 170 | 0.193 | × |

DISPLAY DEVICE

TECHNICAL FIELD

The present invention relates to a display device displaying image light to a viewer.

BACKGROUND ART

In the related art, there has been proposed a so-called head mounted display (HMD), which is a head mounted type display device that allows a viewer to view an image from an image source such as a liquid crystal display (LCD) or an organic EL display through an optical system (for example, Patent Document 1). In such a head mounted type display device, image light projected from the image source is enlarged to display a sharp image on the viewer side through the optical system such as a lens.

Herein, the image source used for such a display device is provided with a plurality of pixel regions that constitute an image and non-pixel regions that are provided between the pixel regions and do not contribute to image display. In a case where the image light emitted from the image source is enlarged by the lens, not only the image constituted by the pixel regions but also the non-image regions caused by the non-pixel regions are enlarged. Accordingly, in some cases, the non-image regions may be visually recognized by the viewer, and thus, a sharp image may be hindered from being displayed. Patent Document 1: Japanese Unexamined Patent Application,

DISCLOSURE OF THE INVENTION

Problems to be Solved by the Invention

An object of the present invention is to provide a display device capable of preventing non-image regions caused by non-pixel regions existing between pixels of an image source.

Means for Solving the Problems

The present invention solves the above problems by the following solution means. In order to facilitate understanding, reference numerals corresponding to embodiments of the present invention are attached in the description, but the invention is not limited thereto.

An aspect of the invention is a display device (1, 201, 301) including an image source (11) that emits image light (L) from a plurality of arranged pixel regions, a lens (12) that enlarges and emits the image light to a viewer side, and an optical sheet (20, 220, 320) that is disposed between the image source and the lens or at the viewer side of the lens, wherein the optical sheet has at least two or more optical layers, and a plurality of unit shapes (21a, 221a, 321a, 23a, 223a, 323a) are formed at each interface between the optical layers.

A second aspect of the invention is the display device according to the first aspect, wherein the unit shapes provided in the optical sheet (20) are convex shapes (21a, 23a), and wherein, in the optical sheet, a difference $\Delta n$ in refractive index between adjacent layers satisfies $0.005 \leq \Delta n \leq 0.1$, a half-value angle $\alpha$ of the optical sheet satisfies $0.05° \leq \alpha \leq 0.2°$, and a diffusion angle $\beta$ of the optical sheet at which luminance is $1/20$ of maximum luminance satisfies $\beta \leq 5 \times \alpha$.

A third aspect of the invention is the display device (1) according to the second aspect, wherein the convex shapes (21a, 23a) extend in a first direction (Z direction, X direction) in a sheet surface (XZ plane) orthogonal to the thickness direction (Y direction) of the optical sheet (20) and are arranged in a second direction (X direction, Z direction) intersecting the first direction in the sheet surface, and a cross-sectional shape of each convex shape in a cross section parallel to the thickness direction of the optical sheet and parallel to the second direction is formed in a substantially arc shape.

A fourth aspect of the invention is the display device (1) according to the third aspect, wherein the optical sheet (20) has three or more optical layers, and extending directions (Z direction, X direction) in the sheet surface (XZ plane) of the convex shapes (21a, 23a) provided at respective interfaces between adjacent optical layers intersect each other when viewed in the thickness direction (Y direction) of the optical sheet.

A fifth aspect of the invention is the display device (201) according to the fourth aspect, wherein the unit shapes provided in the optical sheet (220) are convex shapes (221a, 223a), and when an arrangement pitch of the pixel regions of the image source (11) is denoted by d, and a distance from a display surface of the image source to a position of an eye of a viewer is denoted by D, a diffusion angle $\gamma$ of the optical sheet at which luminance is $1/10$ of maximum luminance satisfies $\arctan(d/D) \leq \gamma \leq 3 \times \arctan(d/D)$.

A sixth aspect of the invention is the display device (201) according to the fifth aspect, wherein the convex shapes (221a, 223a) extend in a first direction in a sheet surface orthogonal to a thickness direction of the optical sheet (220) and are arranged in a second direction intersecting the first direction in the sheet surface, and a cross-sectional shape of each convex shape in a cross section parallel to the thickness direction of the optical sheet and parallel to the second direction is formed in a substantially triangular shape.

A seventh aspect of the invention is the display device (201) according to the sixth aspect, wherein the optical sheet (220) has three or more optical layers, and extending directions of the convex shapes (221a, 223a) provided at interfaces between adjacent optical layers in the sheet surface intersect each other when viewed in the thickness direction of the optical sheet.

An eighth aspect of the invention is the display device (201) according to the fifth aspect, wherein each convex shape (221a, 223a) is formed in a substantially quadrangular pyramid shape arranged along a sheet surface orthogonal to the thickness direction of the optical sheet (220).

A ninth aspect of the invention is the display device (1) according to any one of the fifth to eighth aspect, wherein a difference $\Delta n$ in refractive index between adjacent layers of the optical sheet (220) satisfies $0.005 \leq \Delta n \leq 0.1$.

A tenth aspect of the invention is the display device (301) according to the first aspect, wherein an amount of transmitted light at a diffusion angle of the optical sheet (320) which is −0.1° or more and 0.1° or less is 30% or more of a total amount of transmitted light passing through the optical sheet, and an amount of transmitted light at a diffusion angle of the optical sheet which is −0.3° or more and 0.3° or less is 95% or more of the total amount of transmitted light passing through the optical sheet.

An eleventh aspect of the invention is the display device (301) according to the tenth aspect, wherein an amount of transmitted light at a diffusion angle of the optical sheet (320) which is 0.1° or more and 0.3° or less is 20% or more of the total amount of transmitted light passing through the optical sheet, and an amount of transmitted light at a diffusion angle of the optical sheet which is −0.3° or more and −0.1° or less is 20% or more of the total amount of transmitted light passing through the optical sheet.

A twelfth of the invention is the display device (301) according to the first aspect, wherein an amount of transmitted light at a diffusion angle of the optical sheet (320) is −0.1° or more and 0.1° or less is 30% or more of a total amount of transmitted light passing through the optical sheet, wherein, when a pitch between adjacent pixels of the image source (11) is denoted by d and a shortest distance from a light-emitting surface of the image light in the image source to an eye of a viewer is denoted by D, an amount of transmitted light at a diffusion angle of the optical sheet which is $0.5 \times \sin^{-1}$ (d/D) or more and $5 \times \sin^{-1}$ (d/D) or less is 20% or more of the total amount of transmitted light passing through the optical sheet, and an amount of transmitted light at a diffusion angle of the optical sheet is $-5 \times \sin^{-1}$ (d/D) or more and $-0.5 \times \sin^{-1}$ (d/D) or less is 20% or more of the total amount of transmitted light passing through the optical sheet.

A thirteenth aspect of the invention is the display device (301) according to any one of the tenth to twelfth aspect, wherein a difference Δn in refractive index between adjacent layers of the optical sheet (320) satisfies 0.005≤Δn≤0.1.

Effects of the Invention

According to the present invention, it is possible to prevent the non-image regions caused by the non-pixel regions existing between the pixels of an image source from being visually recognized.

BRIEF DESCRIPTION OF THE DRAWINGS

FIG. 11 is a diagram illustrating a result of visual evaluation of images displayed on display devices according to examples and comparative examples;

PREFERRED MODE FOR CARRYING OUT THE INVENTION

Hereinafter, embodiments of the present invention will be described with reference to the drawings and the like. It should be noted that each of figures including FIG. 1 below is a diagram schematically illustrated, and the size and shape of each component are exaggerated as appropriate for facilitating understanding.

Numerical values, material names, and the like of the dimensions and the like of each member described in this specification are examples as embodiments. However, the present invention is not limited thereto, but these may be appropriately selected and used.

In this specification, terms for specifying shapes and geometric conditions, for example, terms such as parallel and orthogonal have strict meanings as well as such a state where the same optical function is exhibited though there is such an amount of error that does not invalidate being parallel or orthogonal.

First Embodiment

Figure 1:
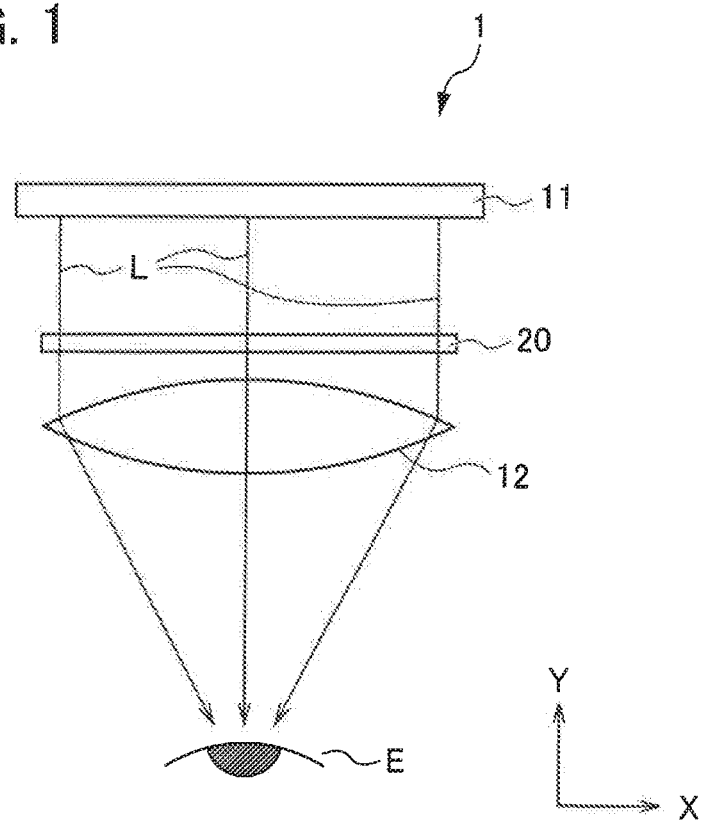
FIG. 1 is a diagram describing a configuration of a head mounted type display device according to a first embodiment.

FIG. 1 is a diagram describing a head mounted type display device 1 according to this embodiment. FIG. 1 is a diagram of the display device 1 when viewed from upside in a vertical direction.

Figure 2A:
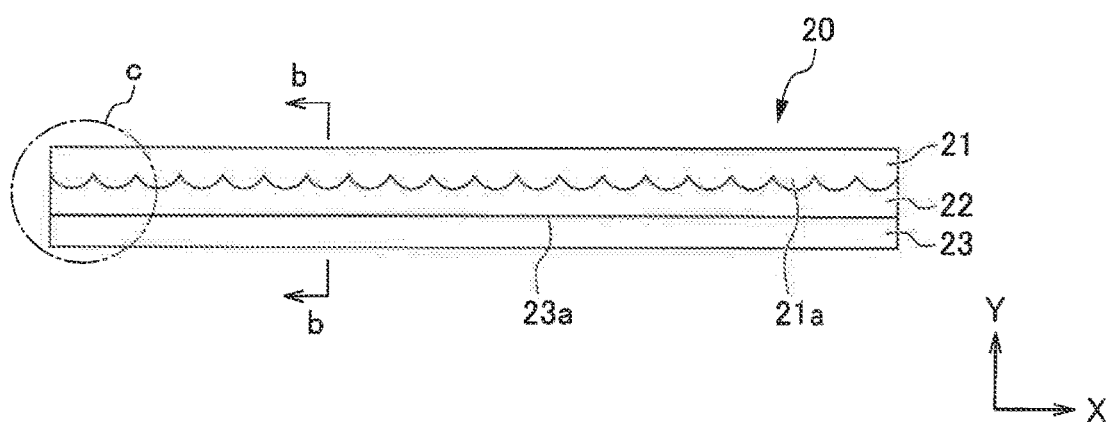
FIGS. 2A to 2D are each a diagram describing details of an optical sheet used for the display device according to the first embodiment.
Figure 2B:
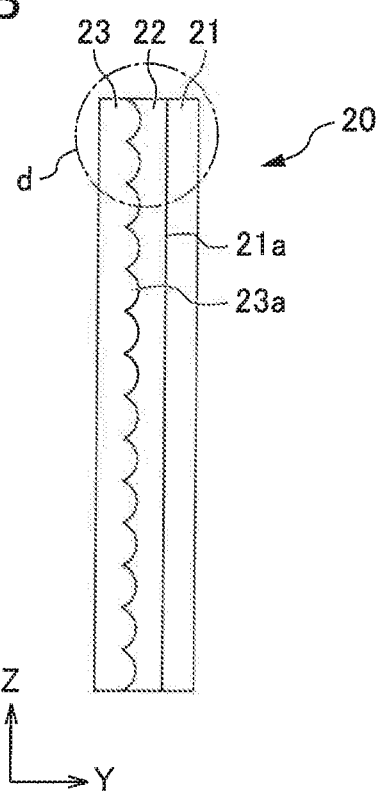
Figure 2C:
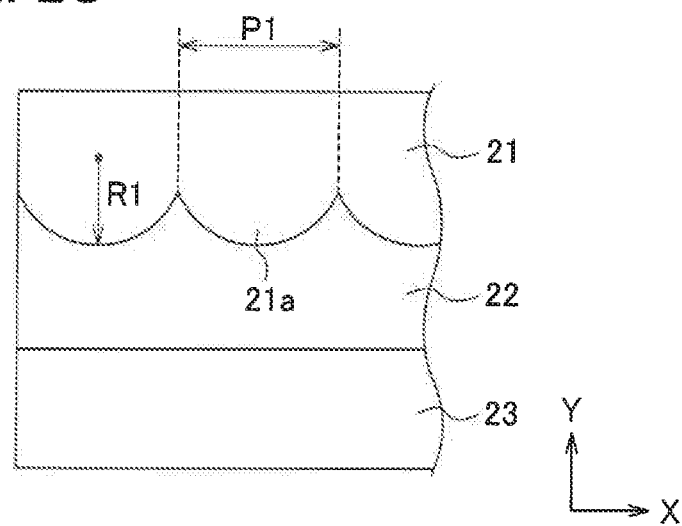
Figure 2D:
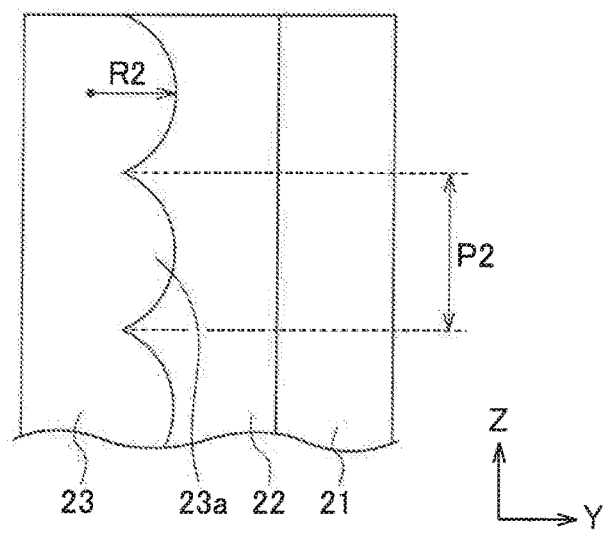

FIGS. 2A to 2D are each a diagram describing details of an optical sheet used for the display device according to the embodiment. FIG. 2A is a cross-sectional diagram taken along a plane parallel to a horizontal plane of the optical sheet, and FIG. 2B is a cross-sectional diagram of a portion b of FIG. 2A. FIG. 2C is a diagram illustrating details of a portion c in FIG. 2A, and FIG. 2D is a diagram illustrating details of a portion d in FIG. 2B.

Figure 3:
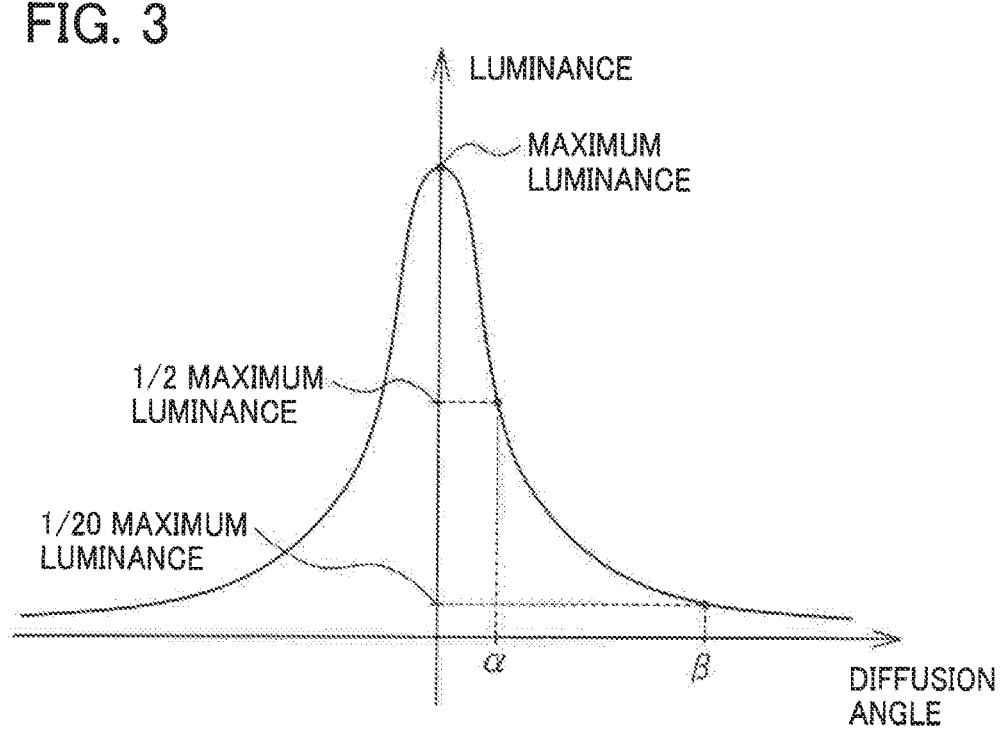
FIG. 3 is a diagram illustrating a relationship between luminance and a diffusion angle of the optical sheet used for the display device according to the first embodiment.

FIG. 3 is a diagram illustrating a relationship between luminance and a diffusion angle of the optical sheet used for the display device according to this embodiment.

Figure 4:
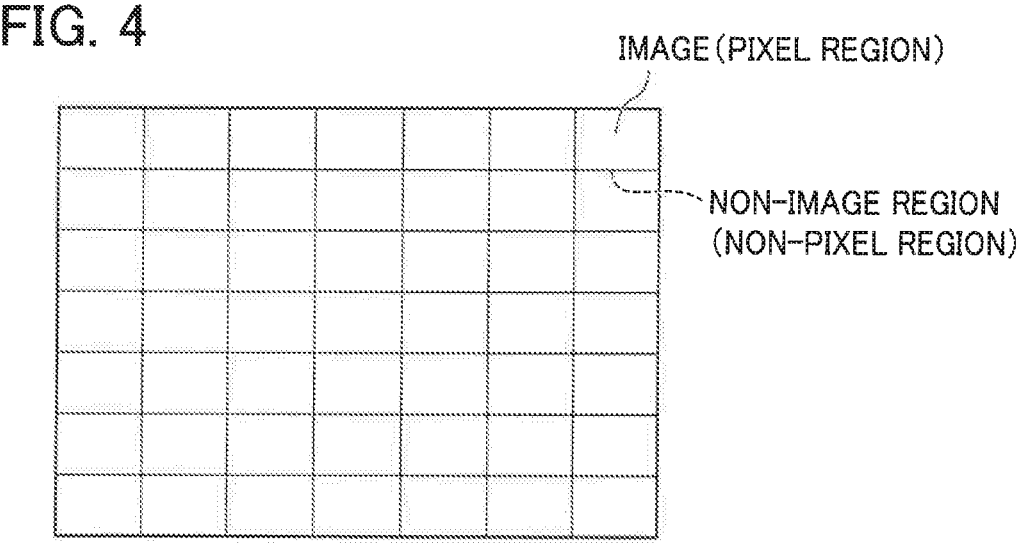
FIG. 4 is a diagram illustrating an example of an image displayed by the display device according to the first embodiment.

FIG. 4 is a diagram illustrating an example of an image displayed by the display device according to this embodiment.

Figure 5A:
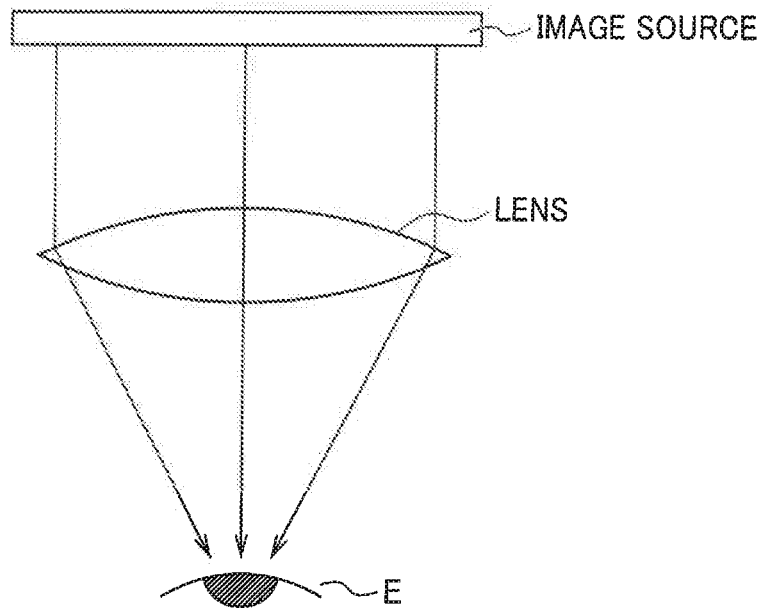
FIGS. 5A and 5B are each a diagram describing a configuration and the like of a display device according to a comparative example.
Figure 5B:
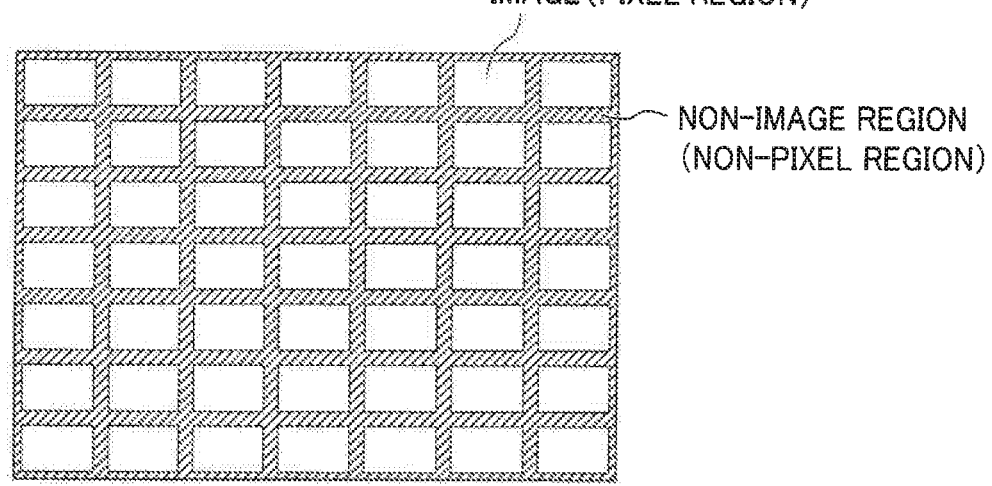

FIGS. 5A and 5B are each a diagram describing a display device according to a comparative example. FIG. 5A is a diagram describing a configuration of the display device according to the comparative example and corresponding to FIG. 1. FIG. 5B is a diagram illustrating an example of an image displayed by the display device according to the comparative example.

It should be noted that, in the following figures including FIG. 1 and in the following description, for facilitating understanding, in a state where a viewer wears the display device 1 on the head, a vertical direction is a Z direction, and horizontal directions are an X direction and a Y direction. Among the horizontal directions, a thickness direction of the optical sheet is defined as the Y direction, and a horizontal direction orthogonal to the thickness direction is defined as the X direction. A −Y side in the Y direction is defined as a viewer side, and a +Y side is defined as a back side.

The display device 1 is a so-called head mounted display (HMD) which is mounted on the head by the viewer and displays an image in front of the eyes of the viewer. As illustrated in FIG. 1, the head mounted type display device 1 according to this embodiment includes an image source 11, a lens 12, and an optical sheet 20 inside an eyeglass frame (not illustrated), and the viewer mounts the eyeglass frame on the head, so that image light displayed on the image source 11 can be visually recognized by the viewer's eyes E through the optical sheet 20 and the lens 12. In addition, in FIG. 1, an example where the display device 1 is disposed with respect to the eye E on one side of the viewer is described. The display device 1 is not limited thereto, but one display device may be arranged for each of the eyes of the viewer.

The image source 11 is a microdisplay that displays image light. For example, a transmissive liquid crystal display device, a reflective liquid crystal display device, an organic EL, or the like may be used. For example, an organic EL display having a diagonal of 5 inches may be used as the image source 11 according to this embodiment.

The lens 12 is a convex lens that enlarges the image light emitted from the image source 11 and emits the enlarged image light toward the viewer side, and in this embodiment, the lens is arranged closest of the display device 1 with respect to the viewer side (−Y side).

As illustrated in FIG. 1, the optical sheet 20 is disposed at a position close to the lens 12 between the image source 11 and the lens 12, and is a light-transmissive sheet having a diffusion function of slightly diffusing a portion of the image light emitted from the image source 11.

As illustrated in FIG. 5A, a head mounted type display device (hereinafter, referred to as a display device according to a comparative example) which is mainly used in the related art has a configuration where the optical sheet described above is not provided and the image light emitted from the image source is enlarged by the lens and displayed on the viewer side. In a display such as an organic EL used for the image source, a plurality of pixel regions for forming an image are arranged on a display unit of the display, and non-pixel regions which do not contribute to image formation are formed between the pixel regions. Accordingly, in a case where the image light emitted from the image source is enlarged through the lens, as illustrated in FIG. 5B, not only the image by the pixel regions but also the non-image regions caused by the non-pixel regions are enlarged. Accordingly, in some cases, not only the image but also the non-image regions are visually recognized by the viewer, and thus, a sharp image may be hindered from being displayed.

As described above, the display device 1 according to this embodiment is provided with the optical sheet 20, which slightly diffuses a portion of the image light emitted from the image source 11, and as illustrated in FIG. 4, it is possible to prevent through the diffused image light the non-image regions caused by the non-pixel regions from being visually recognized by the viewer.

In addition, since the optical sheet 20 is disposed between the image source 11 and the lens 12, it is possible to protect the lens 12 from being scratched and dust or the like from adhering to the lens 12, when the image source 11 is arranged at the eyeglass frame (not illustrated).

Herein, a reflection suppressing layer for suppressing reflection may be provided on a viewer side surface (surface on the −Y side) and/or the back surface (surface on the +Y side) of the optical sheet 20. For example, the reflection suppressing layer may be provided by coating the optical sheet 20 with a general-purpose material (for example, magnesium fluoride ($MgF_2$), silicon dioxide ($SiO_2$), fluorine-based optical coating agent, or the like) having a reflection suppressing function with a predetermined film thickness, or a so-called moth-eye structure having minute concave-convex shapes formed at a pitch smaller than the wavelength of light may be provided on the optical sheet 20.

In a case where the reflection suppressing layer is provided on the back surface of the optical sheet 20, it is possible to prevent the light from reflecting off the back surface of the optical sheet 20 and reflecting again off the image source 11, so that it is possible to prevent the light from straying when light is incident on the optical sheet 20. Accordingly, it is possible to improve the contrast and brightness of the image.

In addition, in a case where the reflection suppressing layer is provided on the viewer side surface of the optical sheet 20, it is possible to prevent the light emitted from the optical sheet 20 from reflecting off the lens 12 and reflecting again off the surface of the optical sheet 20, so that it is possible to prevent the light from straying. Accordingly, it is possible to improve the contrast and brightness of the image.

In addition, as described above, since the optical sheet 20 according to this embodiment is disposed between the image source 11 and the lens 12, when minute concave-convex shapes (so-called moth-eye structure) are applied to the reflection suppressing layer, it is possible to prevent the concave-convex shapes from being touched by the wearer or the like of the display device 1 and from being damaged.

It may be preferable that the distance between the optical sheet 20 and the eye E of the viewer in the Y direction is 100 times or more an arrangement pitch of the pixel regions of the image source 11. If the distance between the optical sheet 20 and the eye E of the viewer is less than 100 times, moiré (interference fringe) due to the pixel regions may be visually recognized or non-image regions due to the non-pixel regions may be easily observed conspicuously, and thus, it may not be preferable.

In general, the arrangement pitch of the pixel regions of the image source 11 is 400 to 500 ppi (pixel per inch). For example, in a case where the arrangement pitch of the pixel regions of the image source 11 is 0.0508 mm (500 ppi), it may be preferable that the distance in the Y direction from the viewer side surface of the optical sheet 20 to the eye E of the viewer is 5.08 mm or more.

As illustrated in FIG. 2, the optical sheet 20 has layers: a first optical layer 21; a second optical layer 22; and a third optical layer 23 in this order from the back side (+Y side). In the optical sheet 20, a plurality of convex shapes 21a are formed at an interface between the first optical layer 21 and the second optical layer 22 and a plurality of convex shapes 23a are formed at an interface between the second optical layer 22 and the third optical layer 23, respectively.

The first optical layer 21 is a light-transmissive layer located the utmost back side (+Y side) of the optical sheet 20, and the back side surface is a substantially flat surface on which image light emitted from the image source 11 is incident. As illustrated in FIG. 2A, the plurality of convex shapes 21a are formed on the viewer side (−Y side) surface of the first optical layer 21. The convex shapes 21a extend in the vertical direction (Z direction) along the viewer side surface of the first optical layer 21, and are arranged in the horizontal direction (X direction). Each convex shape is such a lenticular lens shape that the cross-sectional shape at a plane (XY plane) parallel to the horizontal direction and the thickness direction is formed in a substantially arc shape. Herein, the substantially arc shape may denote not only an arc of a true circle but also a curved shape including a portion of an ellipse, an oval, or the like.

The third optical layer 23 is a light-transmissive layer located on the utmost viewer side (−Y side) of the optical sheet 20, and the viewer side surface is a substantially flat surface from which the image light passing through the optical sheet 20 is emitted. As illustrated in FIG. 2B, a plurality of convex shapes 23a are formed on the back side (+Y side) surface of the third optical layer 23. The convex shapes 23a extend in the horizontal direction (X direction) along the surface of the back side of the third optical layer 23, and are arranged in the vertical direction (Z direction). Each convex shape is such a lenticular lens shape that a cross-sectional shape is formed in a substantially arc shape at a plane (YZ plane) parallel to the vertical direction and the thickness direction.

In other words, an extending direction (X direction) of the convex shapes 23a provided in the third optical layer 23 intersects (is orthogonal to) an extending direction (Z direction) of the convex shapes 21a provided in the above-mentioned first optical layer 21.

The second optical layer 22 is a light-transmissive layer provided between the first optical layer 21 and the third optical layer 23, and a surface of a convex shape 21a side of the first optical layer 21 and a surface of a convex shape 23a side of the third optical layer 23 are disposed to face each other.

The optical sheet 20 according to this embodiment is formed so that a half-value angle $\alpha$ satisfies $0.05° \leq \alpha \leq 0.2°$ and a diffusion angle $\beta$ at which the luminance is 1/20 of the maximum luminance satisfies $\beta \leq 5 \times \alpha$. Herein, as illustrated in FIG. 3, the half-value angle $\alpha$ of the optical sheet 20 denotes an observation angle at which the luminance of light has a half of the maximum value in the horizontal direction of the screen and in the vertical direction of the screen from the observation position of the sheet surface of the optical sheet 20 at which the luminance of the light has the maximum value. In addition, the diffusion angle $\beta$ denotes an observation angle at which the luminance of light has a value of 1/20 of the maximum value in the horizontal direction of the screen and in the vertical direction of the screen from the observation position of the sheet surface of the optical sheet 20 at which the luminance of the light has the maximum value.

In addition, the optical sheet 20 according to this embodiment is formed so that differences in refractive index between the adjacent layers, that is, a difference $\Delta n1$ in refractive index between the first optical layer 21 and the second optical layer 22 and a difference $\Delta n2$ in refractive index between the second optical layer 22 and the third optical layer 23 satisfy $0.005 \leq \Delta n1 \leq 0.1$ and $0.005 \leq \Delta n2 \leq 0.1$, respectively.

In this manner, by defining the range of the half-value angle $\alpha$ and the diffusion angle $\beta$ of the optical sheet 20 and ranges of the differences ($\Delta n1$, $\Delta n2$) in refractive index between the adjacent layers, the display device 1 according to this embodiment can slightly diffuse the image light emitted from the image source 11 in the vertical direction and the horizontal direction. Accordingly, the display device 1 not only can display a sharp image on the viewer side but also can prevent the non-image regions caused by the non-pixel regions of the image source 11 from being conspicuous due to slight diffusion of the image light.

From the viewpoint of more effectively exhibiting the above effect, it may be more preferable that the diffusion angle $\beta$ of the optical sheet 20 is equal to or close to the half-value angle $\alpha$.

It may not be preferable if the half-value angle $\alpha$ is less than 0.05°, since the range in which light is diffused by the optical sheet becomes too narrow, and the non-image regions caused by the non-pixel regions cannot be allowed to be inconspicuous. In addition, it may not be preferable if the half-value angle $\alpha$ is larger than 0.2°, since the range in which the image light is diffused becomes too wide, and the sharpness of the image is decreased.

In addition, it may not be preferable if the diffusion angle $\beta$ is larger than $5 \times \alpha$, since the range in which the image light with low luminance is diffused becomes too wide, and the sharpness of the image is decreased.

Furthermore, it may not be preferable if the differences ($\Delta n1$, $\Delta n2$) in refractive index between the adjacent layers are less than 0.005, since the differences in refractive index between the respective layers becomes too small, and the refraction of the image light between the respective layers becomes difficult to occur, so that, a sufficient diffusion function cannot be exhibited. In addition, it may not be preferable if the differences ($\Delta n1$, $\Delta n2$) in refractive index between the adjacent layers are larger than 0.1, since the refraction of light between the respective layers becomes too large, so that the image light passing through the optical sheet becomes unclear.

Each of the first optical layer 21 and the third optical layer 23 is made of a PC (polycarbonate) resin, an MS (methyl methacrylate styrene) resin, an acrylic resin, or the like having high optical transparency. In this embodiment, both the first optical layer 21 and the third optical layer 23 are made of the same material, so that the two optical layers have the same refractive index.

In addition, the second optical layer 22 is made of an UV curable resin such as a urethane acrylate resin or an epoxy acrylate resin having high optical transparency or the like. In this embodiment, the second optical layer is formed to have a refractive index lower than the refractive indexes of the first optical layer 21 and the third optical layer 23.

In addition, in a case where the cross-sectional shape of each convex shape 21a in the XY cross section is formed in an arc shape, it may be preferable that each convex shape 21a is formed in a range of $0.05 \leq P1/R1 \leq 1.0$, as illustrated in FIG. 2C, where an arrangement pitch of the convex shapes 21a in the horizontal direction (X direction) formed in the first optical layer 21 is denoted by P1 and a radius of curvature of an arc-shaped cross-sectional shape of each convex shape 21a in the XY cross section is denoted by R1.

Similarly, in a case where a cross-sectional shape of each convex shape 23a in the YZ cross section is formed in an arc shape, it may be preferable that each convex shape 23a is formed in a range of $0.05 \le P2/R2 \le 1.0$, as illustrated in FIG. 2D, where an arrangement pitch of the convex shapes 23a in the vertical direction (Z Direction) formed in the third optical layer 23 is denoted by P2 and a radius of curvature of an arc-shaped cross-sectional shape of each convex shape 23a in the YZ cross section is denoted by R2.

In this manner, by forming the arrangement pitches and radii of curvature of the convex shapes 21a and the convex shapes 23a in the above-described ranges, respectively, the display device 1 can slightly diffuse the image light emitted from the image source 11 efficiently and uniformly in the vertical direction and the horizontal direction.

In addition, the optical sheet 20 according to this embodiment is formed so that the convex shapes 21a and the convex shapes 23a have the same shape, that is, P1=P2 and R1=R2.

Next, the operations until image light L emitted from the image source 11 reaches the eye E of the viewer will be described.

As illustrated in FIG. 1, the image light L emitted from the image source 11 is incident on the back side (+Y side) surface of the optical sheet 20. Then, the image light L incident on the optical sheet 20 passes through the first optical layer 21 and is slightly diffused in the horizontal direction (X direction) by the convex shapes 21a at the interface between the first optical layer 21 and the second optical layer 22 to pass through the second optical layer 22.

The image light L passing through the second optical layer 22 is slightly diffused in the vertical direction (Z direction) by the convex shapes 23a formed at the interface between the second optical layer 22 and the third optical layer 23 and passes through the third optical layer 23 to be emitted from the viewer side (−Y side) surface of the optical sheet 20.

Subsequently, the image light L emitted from the viewer side surface of the optical sheet 20 is incident on the lens 12 and is emitted to the eye E of the viewer. Herein, the image light L emitted from the image source 11 is slightly diffused in the horizontal direction and the vertical direction by the optical sheet 20. Therefore, even if the image light L is enlarged by the lens 12, as illustrated in FIG. 4, as compared with the case of the display device according to the above-described comparative example (refer to FIG. 5B), in the image viewed by the eye E of the viewer, it is possible to prevent the non-image regions caused by the non-pixel regions of the image source 11 from being conspicuous as much as possible, and it is possible to display a sharp image.

Next, a method of manufacturing the optical sheet 20 used for the display device 1 according to this embodiment will be described.

As described above, since the convex shapes 21a and the convex shapes 23a provided on the first optical layer 21 and the third optical layer 23 of the optical sheet 20 are formed in the same shape, first, a sheet-like member where the convex shapes are formed is formed by using a mold provided with concave shapes corresponding to the convex shapes through an extrusion molding method, an injection molding method, or the like.

Then, the sheet-like member where the convex shapes are formed is cut into a predetermined size to obtain the first optical layer 21 and the third optical layer 23. In this manner, in a case where the convex shapes 21a and the convex shapes 23a are formed in the same shape, the first optical layer 21 and the third optical layer 23 can be simultaneously cut out from one sheet-like member, and thus, it is possible to improve the manufacturing efficiency of the optical sheet 20.

Subsequently, the surface of the first optical layer 21 on the convex shape 21a side is filled with a resin for forming the second optical layer 22, the resin and the surface of the third optical layer 23 on the convex shape 23a side are attached with each other, and the resin is cured in a state where a predetermined distance is provided between the first optical layer 21 and the third optical layer 23. At this time, the first optical layer 21 and the third optical layer 23 are arranged so that the extending direction of the convex shapes 21a intersects (is orthogonal to) the extending direction of the convex shapes 23a.

In this manner, the optical sheet 20 where the first optical layer 21, the second optical layer 22, and the third optical layer 23 are sequentially laminated is completed.

As described above, the display device 1 according to this embodiment is formed so that the optical sheet 20 having a layer structure of at least two or more layers and having a plurality of convex shapes formed at interfaces between the layers is provided, the differences Δn1 and Δn2 in refractive index between adjacent layers of the optical sheet 20 satisfy $0.005 \le \Delta n1 \le 0.1$ and $0.005 \le \Delta n2 \le 0.1$, respectively, the half-value angle α satisfies $0.05° \le \alpha \le 0.2°$, and the diffusion angle β of the optical sheet 20 at which the luminance is 1/20 of the maximum luminance satisfies $\beta \le 5 \times \alpha$. Accordingly, the display device 1 can slightly diffuse the image light emitted from the image source 11 in the vertical direction and the horizontal direction, so that the display device 1 can display a sharp image on the viewer side and can prevent the non-image regions caused by the non-pixel regions of the image source 11 from being visually recognized by the viewer.

In addition, in the display device 1 according to this embodiment, the convex shapes 21a extend in the Z direction (first direction) in the sheet surface (XZ plane) orthogonal to the thickness direction (Y direction) of the optical sheet 20 and are arranged in the X direction (second direction) orthogonal to the Z direction in the sheet surface. Each convex shape 21a has the cross-sectional shape in a substantially arc shape at a cross section (XY plane) parallel to the thickness direction of the optical sheet 20 and parallel to the X direction (second direction). Similarly, the convex shapes 23a extend in the X direction in the sheet surface (XZ plane) orthogonal to the thickness direction (Y direction) of the optical sheet 20 and are arranged in the Z direction orthogonal to the X direction in the sheet surface. Each convex shape 23a has the cross-sectional shape in an arc shape at a cross section (YZ plane) parallel to the thickness direction of the optical sheet 20 and parallel to the Z direction. Therefore, the display device 1 can efficiently and uniformly diffuse the image light passing through the convex shapes.

Furthermore, in the display device 1 according to this embodiment, in which the optical sheet 20 has a layer structure of three or more layers, the extending directions in the sheet surface (Z direction, X direction) of the convex shape 21a and the convex shape 23a provided at interfaces between adjacent layers are orthogonal to (intersect) each other as viewed in the thickness direction of the optical sheet 20. In this manner, the display device 1 can diffuse the image light emitted from the image source 11 in a plurality of directions (horizontal directions and vertical direction), so that the display device 1 effectively allows the non-image regions caused by the non-pixel regions of the image source 11 to be more inconspicuous.

Second Embodiment

Next, a display device 201 according to a second embodiment will be described.

In the following description and the drawings, components performing the same functions as those of the above-described first embodiment are denoted by the same reference numerals or suffixes (lower two digits), and redundant description is appropriately omitted.

Figure 7:
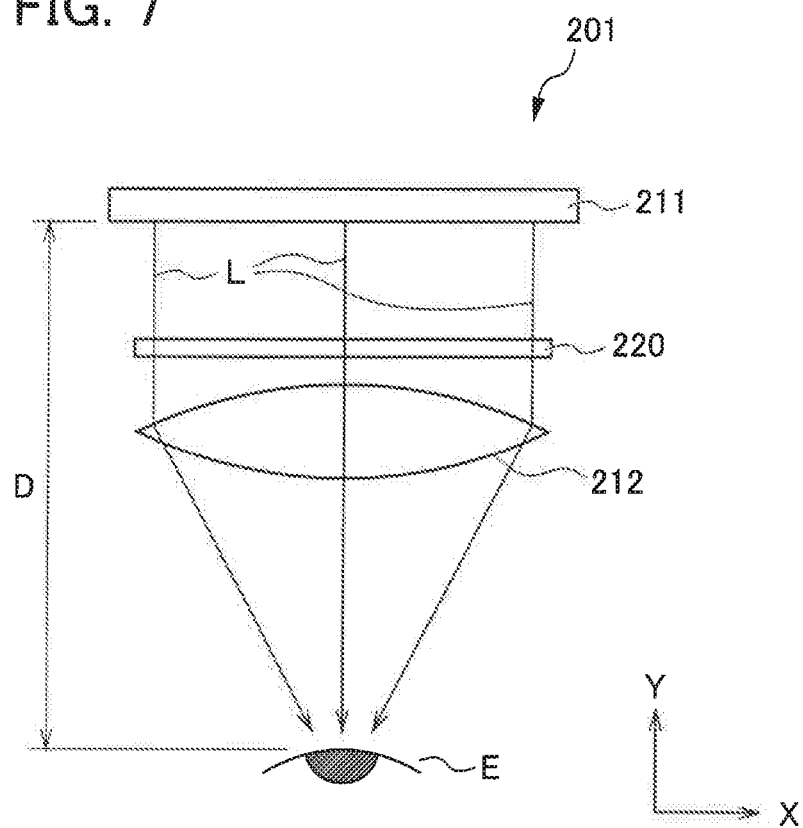
FIG. 7 is a diagram describing a configuration of a head mounted type display device according to a second embodiment.

FIG. 7 is a diagram describing the head mounted type display device 201 according to this embodiment. FIG. 7 is a diagram of the display device 201 as viewed from upside in a vertical direction. As illustrated in FIG. 7, the display device 201 according to this embodiment is different from the display device 1 according to the above-described first embodiment in that an optical sheet 220 is provided instead of the optical sheet 20.

Figure 8A:
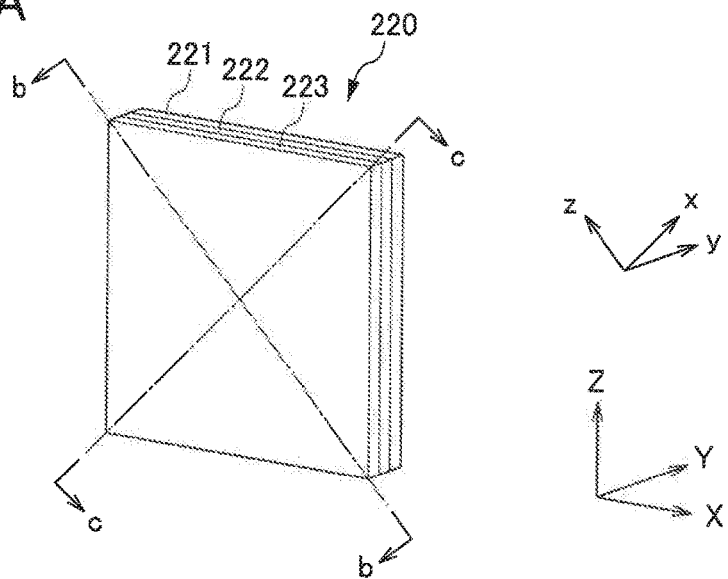
FIGS. 8A to 8C are each a diagram describing an optical sheet used for the display device according to the second embodiment.
Figure 8B:
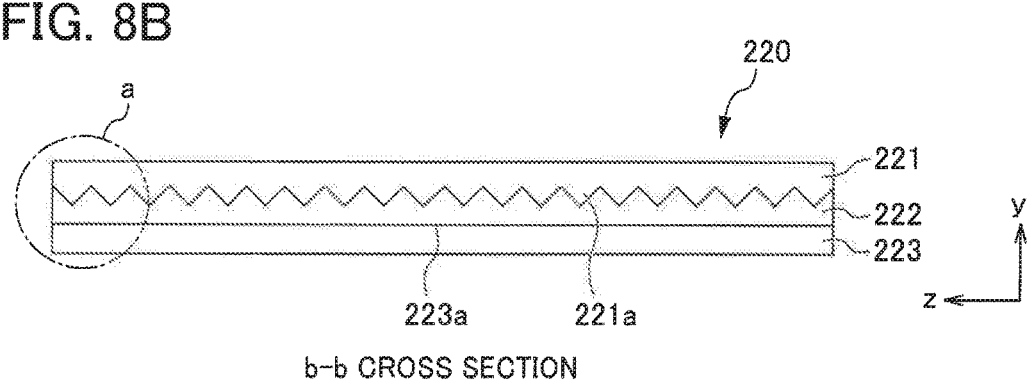
Figure 8C:
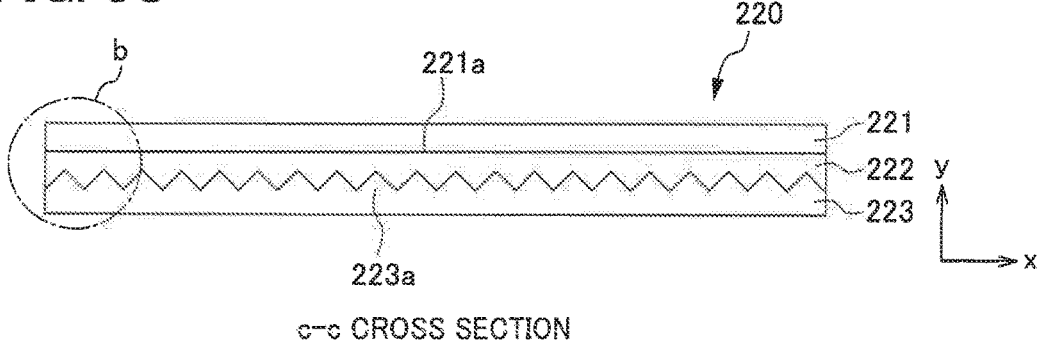

FIGS. 8A to 8C are each a diagram describing details of the optical sheet used for the display device according to this embodiment. FIG. 8A is a perspective diagram of the optical sheet. FIG. 8B is a cross-sectional diagram taken along line b-b in FIG. 8A. FIG. 8C is a cross-sectional diagram taken along the line c-c in FIG. 8A.

Figure 9A:
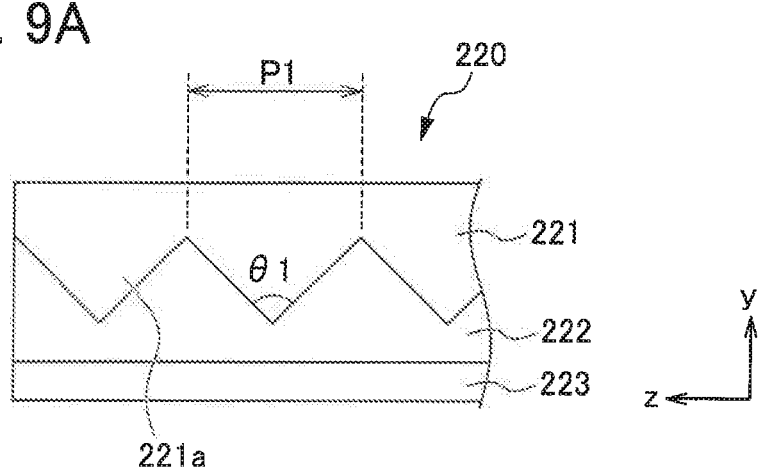
FIGS. 9A and 9B are each a diagram describing details of the optical sheet used for the display device according to the second embodiment.
Figure 9B:
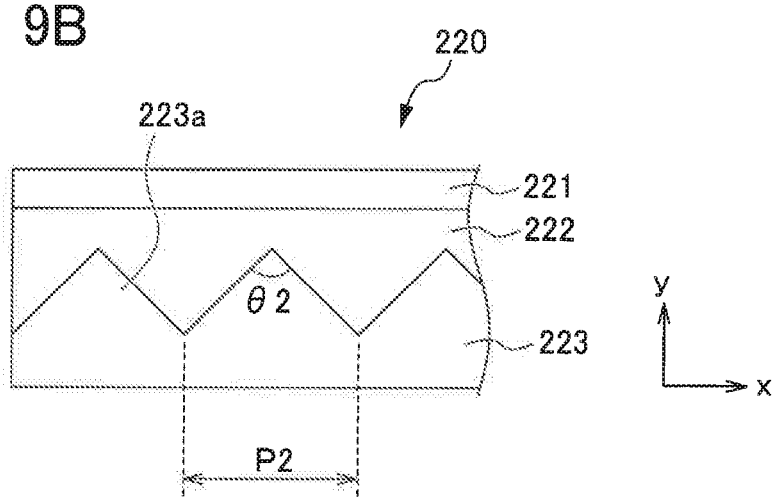

FIGS. 9A and 9B are each a diagram describing details of the optical sheet used for the display device according to this embodiment. FIG. 9A is a diagram illustrating details of a portion "a" in FIG. 8B, and FIG. 9B is a diagram illustrating details of a portion "b" in FIG. 8C.

Figure 10A:
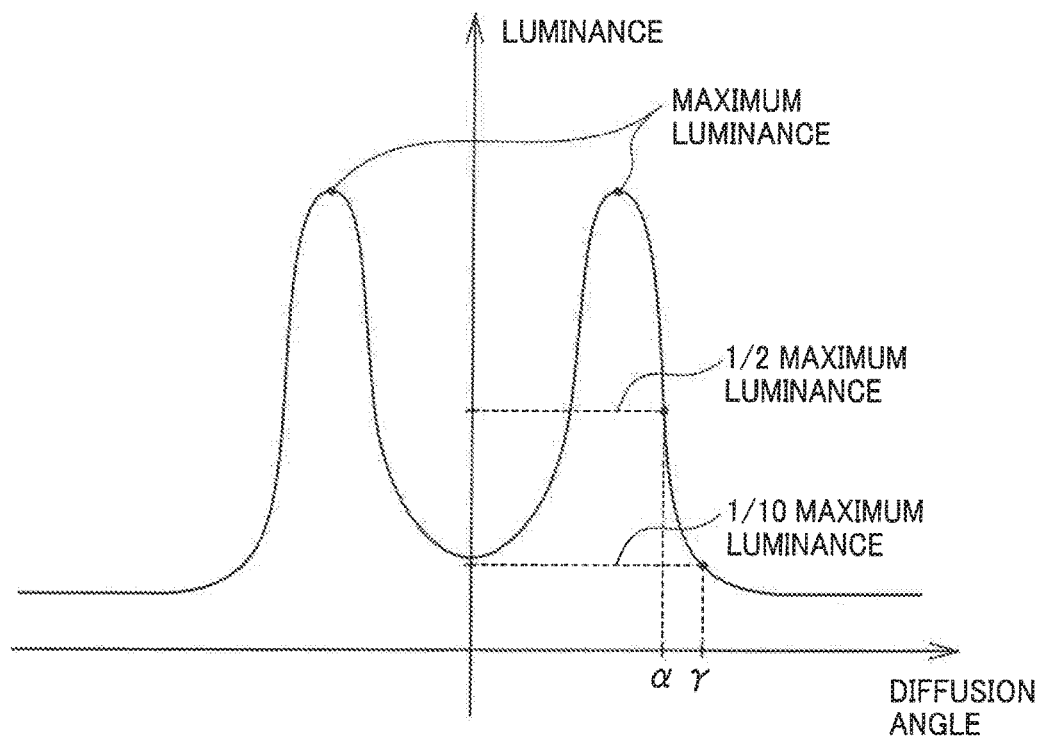
FIGS. 10A and 10B are each a diagram illustrating a relationship between luminance and a diffusion angle of the optical sheet used for the display device according to the second embodiment.
Figure 10B:
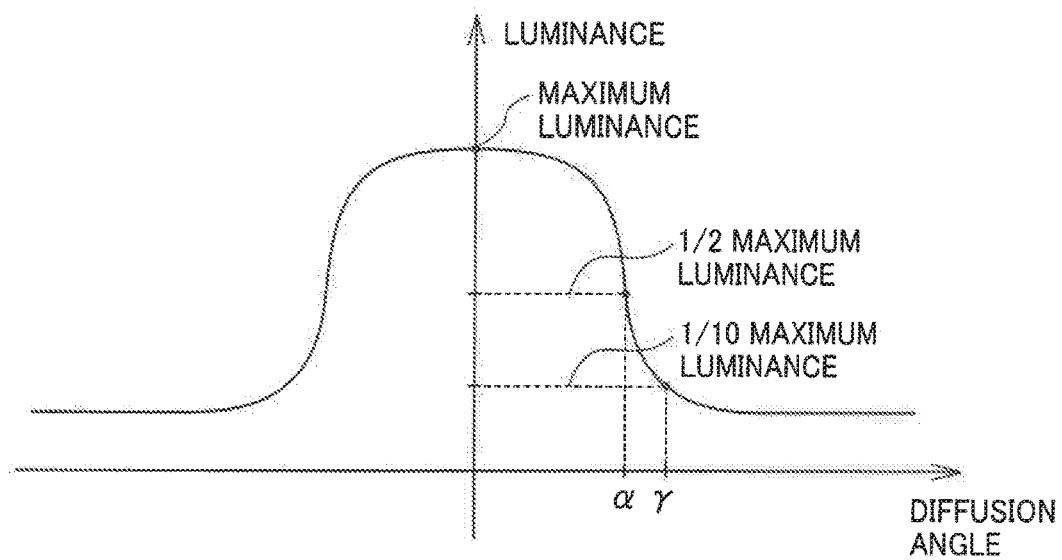

FIGS. 10A and 10B are each a diagram illustrating a relationship between luminance and a diffusion angle of the optical sheet used for the display device according to this embodiment.

In addition, in FIGS. 8A to 8C and the like, a coordinate system obtained by rotating the above-described XYZ orthogonal coordinate system by 45 degrees around the Y axis is defined as an xyz orthogonal coordinate system. That is, a y direction is a direction parallel to the above thickness direction (Y direction), an x direction is a direction inclined by +45 degrees with respect to a horizontal direction (X direction), and a z direction is a direction inclined by +45 degrees with respect to a vertical direction (Z Direction).

As illustrated in FIG. 7, the optical sheet 220, which is disposed between an image source 211 and a lens 212 at a position close to the lens 212, is a light-transmissive sheet having a diffusion function of slightly diffusing the image light emitted from the image source 211.

In the optical sheet 220, as illustrated in FIG. 8A, a first optical layer 221, a second optical layer 222, and a third optical layer 223 are laminated in order from a back side (+Y side). In the optical sheet 220, a plurality of convex shapes 221a and a plurality of convex shapes 223a are formed on an interface between the first optical layer 221 and the second optical layer 222 and an interface between the second optical layer 222 and the third optical layer 223, respectively. The first optical layer 221 is a light-transmissive layer located on the utmost back side (+Y side) of the optical sheet 220, and a back side surface is a substantially flat surface on which image light emitted from the image source 211 is incident. As illustrated in FIG. 8B, the plurality of convex shapes 221a are formed on a viewer side (−y side, −Y side) surface of the first optical layer 221. The convex shapes 221a, which extend in the x direction inclined by 45 degrees with respect to the horizontal direction (X direction) along a viewer side surface of the first optical layer 221, are arranged in the z direction inclined by 45 degrees with respect to the vertical direction (Z direction). Each convex shape 221a has a cross-sectional shape in a substantially triangular shape that is a so-called prism shape at a plane (yz plane) parallel to the z direction and the y direction. Herein, the substantially triangular shape denotes not only a triangular shape including an isosceles triangle, an equilateral triangle, or the like, but also a triangular shape a vertex of which is chamfered into a curved surface or a flat plane, a slope of which is slightly curved, and the like.

The second optical layer 222 is a light-transmissive layer provided between the first optical layer 221 and the third optical layer 223, and a surface of a convex shape 221a side of the first optical layer 221 and a surface of a convex shape 223a side of the third optical layer 223 are attached to face each other.

The third optical layer 223 is a light-transmissive layer located on the utmost viewer side (−Y side) of the optical sheet 220. A viewer side surface of the third optical layer 223 is a substantially flat surface from which the image light passing through the optical sheet 220 is emitted. As illustrated in FIG. 8C, a plurality of convex shapes 223a are formed on a surface of the back side (+y side, +Y side) of the third optical layer 223. The convex shapes 223a, which extend in the z direction inclined by 45 degrees with respect to the vertical direction (Z direction) along the surface of the back side of the third optical layer 223, are arranged in the x direction inclined by 45 degrees with respect to the horizontal direction (X direction). Each convex shape 223a is formed such that a cross-sectional shape at a plane (xy plane) parallel to the x direction and the y direction is a substantially triangular shape, that is, a so-called prism shape. In other words, an extending direction (z direction) of the convex shapes 223a provided in the third optical layer 223 intersects (is orthogonal to) an extending direction (x direction) of the convex shapes 221a provided in the above-described first optical layer 221.

Herein, the eyes of a human being tend to recognize visually lines extending in the horizontal direction (X direction) more easily than lines or the like extending in a direction inclined with respect to the horizontal direction or in the vertical direction (Z direction). Accordingly, as described above, by inclining the extending directions of the convex shapes with respect to the horizontal direction, the display device 201 according to this embodiment can make it difficult to allow the viewer to visually recognize the line caused by the convex shapes, and thus, it is possible to allow the viewer to visually recognize the displayed image more clearly.

In the optical sheet 220 according to this embodiment is formed so that, when an arrangement pitch of pixel regions of the image source 211 is denoted by d and a distance from a display surface of the image source 211 to an eye E of the viewer wearing the display device 201 is denoted by D (refer to FIG. 7), a diffusion angle γ at which luminance is 1/10 of the maximum luminance satisfies the following Mathematical Formula (1). It may be more preferable that the optical sheet 220 is formed so that a half-value angle α satisfies the following Mathematical Formula (2).

Herein, a relationship between the luminance and the diffusion angle of the optical sheet 220 according to this embodiment is a waveform having two peaks corresponding to slopes of the convex shapes formed in a substantially triangular shape as illustrated in FIG. 10A or a waveform having a wide peak as illustrated in FIG. 10B. The diffusion angle γ denotes an angle of which absolute value is largest among observation angles at which the luminance of light is ⅒ of the maximum value from the position which is the center of the two peaks as illustrated in FIG. 10A (the axis of luminance in FIG. 10A, or the center position of the wide peak in FIG. 10B (the axis of luminance in FIG. 10B) in the horizontal direction of the screen and the vertical direction of the screen. In addition, the half-value angle α of the optical sheet 220 is an angle of which absolute value is largest among the observation angles at which the luminance of the light is half the maximum value from the position which is the center of the two peaks (the axis of luminance in FIG. 10A, or the center position of the wide peak in FIG. 10B (the axis of luminance in FIG. 10B) in the horizontal direction of the screen and the vertical direction of the screen.

$$\arctan(d/D) \leq \gamma \leq 3 \times \arctan(d/D) \quad \text{Mathematical Formula (1):}$$

$$\arctan(d/D) \leq \alpha \leq 3 \times \arctan(d/D) \quad \text{Mathematical Formula (2):}$$

In addition, the optical sheet 220 according to this embodiment is formed so that differences in refractive index between the adjacent layers, that is, a difference $\Delta n1$ in refractive index between the first optical layer 221 and the second optical layer 222 and a difference $\Delta n2$ in refractive index between the second optical layer 222 and the third optical layer 223 satisfy $0.005 \leq \Delta n1 \leq 0.1$ and $0.005 \leq \Delta n2 \leq 0.1$, respectively.

In this manner, by specifying the range of the values of the diffusion angle γ and the half-value angle α of the optical sheet 220 and the range of the differences ($\Delta n1$, $\Delta n2$) in the refractive indexes between the adjacent layers, the display device 201 according to this embodiment can slightly diffuse the image light emitted from the image source 211 in the x direction or the z direction. Therefore, the display device 201 can display a sharp image on the viewer side and can prevent the non-image regions caused by the non-pixel regions of the image source 211 from being conspicuous due to slight diffusion of the image light.

It may not be preferable if the diffusion angle γ is less than arctan (d/D). The reason for this is that the range in which light is diffused by the optical sheet becomes too narrow, and thus, the non-image regions caused by the non-pixel regions cannot be made inconspicuous. In addition, it may not be preferable if the diffusion angle γ is larger than 3×arctan (d/D). The reason for this is that the range of diffusion of the image light becomes too wide, and thus, the image is blurred, so that the sharpness of the image is decreased. In addition, it may not be preferable either if the half-value angle α is less than arctan (d/D). Similarly to the case of the diffusion angle γ, the reason for this is that the range in which light is diffused by the optical sheet becomes too narrow, and thus, the non-image regions caused by the non-pixel regions cannot be made inconspicuous.

In addition, it may not be preferable if the half-value angle α is larger than 3×arctan (d/D). Similarly to the case of the diffusion angle γ, the reason for this is that the range in which the image light is diffused becomes too wide, and thus, the image is blurred, so that the sharpness of the image is decreased.

Furthermore, it may not be preferable if the differences ($\Delta n1$, $\Delta n2$) in the refractive indexes between the adjacent layers are less than 0.005. The reason for this is that the differences in refractive indexes between the respective layers become too small, and thus, the refraction of the image light between the adjacent layers becomes difficult to occur, so that a sufficient diffusion function cannot be exhibited.

In addition, it may not be preferable if the differences ($\Delta n1$, $\Delta n2$) in the refractive indexes between adjacent layers are larger than 0.1, since the refraction of light between the adjacent layers becomes too large, so that the image light passing through the optical sheet becomes unclear. In addition, it may not be preferable if the above-mentioned Mathematical Formula (1) and (2) are satisfied for a case where the differences in refractive indexes are larger than 0.1. The reason for this is that it is necessary to form each convex shape into a flat shape, and thus, it is difficult to manufacture an optical sheet having convex shapes.

In addition, from the viewpoint of making the optical sheet easier to manufacture and refracting the light to such a sufficient degree that the non-image regions can be made inconspicuous, it may be more preferable that the differences ($\Delta n1$, $\Delta n2$) in refractive indexes between the adjacent layers are 0.05.

Each of the first optical layer 221 and the third optical layer 223 is made of a PC (polycarbonate) resin, an MS (methyl methacrylate styrene) resin, an acrylic resin, or the like having high optical transparency, and in this embodiment, both the first optical layer 221 and the third optical layer 223 are made of the same material, so that the two optical layers have the same refractive index.

In addition, the second optical layer 222 is made of an UV curable resin such as a urethane acrylate resin or an epoxy acrylate resin, or the like having high optical transparency, and in this embodiment, the second optical layer 222 is formed to have a refractive index lower than the refractive indexes of the first optical layer 221 and the third optical layer 223.

In the optical sheet 220 according to this embodiment, each of the convex shapes 221a and 223a of which the cross-sectional shape in the cross section parallel to the thickness direction of the optical sheet 220 and parallel to the arrangement direction is formed in an isosceles triangle shape. In addition, each of the convex shapes 221a and 223a is formed in a state where the isosceles triangle shapes are consecutively arranged in each arrangement direction.

When an arrangement pitch of the convex shapes 221a in the z direction is denoted by P1 and a vertex angle of the triangular shape is denoted by θ1 as illustrated in FIG. 9A and when an arrangement pitch of the convex shapes 223a in the x direction is denoted by P2 and a vertex angle of the triangular shape is denoted by θ2 as illustrated in FIG. 9B, the convex shapes 221a and 223a are formed with, for example, P1=P2=0.2 mm and θ1=θ2=175 degrees.

Herein, it may be preferable that the arrangement pitches P1 and P2 of the convex shapes are formed in a range of 0.1 mm≤P1≤0.5 mm and a range of 0.1 mm≤P2≤0.5 mm, respectively. It may not be preferable if the arrangement pitches P1 and P2 are less than 0.1 mm, since it is difficult to manufacture the convex shapes having such a size, and light diffraction phenomenon is likely to occur. In addition, it may not be preferable if the arrangement pitches P1 and P2 are larger than 0.5 mm, since the lines between adjacent convex shapes may be visually recognized.

In addition, the arrangement pitch of the pixel regions of the image source 211 at this time is, for example, d=0.0508 mm (500 ppi (pixel per inch)), and the distance from the display surface of the image source 211 to the eye E of the viewer is D=50 mm.

In addition, the arrangement pitches P1 and P2 of the convex shapes, the vertex angles θ1 and θ2, the distance D, and the arrangement pitch d of the pixel regions of the image source 211 are not limited to the above-mentioned dimensional values, but these may be appropriately set depending on the specification of the image source 211, the size of the image to be displayed, or the like.

Next, operations until an image light L emitted from the image source 211 reaches the eye E of the viewer will be described.

The image light L emitted from the image source 211 is incident on the back side (+Y side) surface of the optical sheet 220. Then, the image light L incident on the optical sheet 220 passes through the first optical layer 221 and is slightly diffused in the z direction by the convex shapes 221a at the interface between the first optical layer 221 and the second optical layer 222 to pass through inside the second optical layer 222.

The image light L passing through the second optical layer 222 is slightly diffused in the x direction by the convex shapes 223a formed at the interface between the second optical layer 222 and the third optical layer 223 and passes through the third optical layer 223 to be emitted from a viewer side (−Y side) surface of the optical sheet 220.

Subsequently, the image light L emitted from the viewer side surface of the optical sheet 220 is incident on the lens 212 and is emitted to the eye E of the viewer. Herein, the image light L emitted from the image source 211 is slightly diffused in the z direction and the x direction by the optical sheet 220 as described above. Accordingly, even if the image light L is enlarged by the lens 212, it is possible to prevent the non-image regions caused by the non-pixel regions of the image source 211 from being conspicuous in the image viewed by the eye E of the viewer as much as possible, as illustrated in FIG. 4, in comparison with the case of the display device of the above-described comparative example (refer to FIG. 5B). As a result, it is possible to display a sharp image.

Next, a method of manufacturing the optical sheet 220 used for the display device 201 according to this embodiment will be described.

As described above, since the convex shapes 221a and the convex shapes 223a provided on the first optical layer 221 and the third optical layer 223 of the optical sheet 220 are formed in the same shape, first, a sheet-like member where the convex shapes are formed is formed by using a mold provided with concave shapes corresponding to the convex shapes through an extrusion molding method, an injection molding method, or the like. Then, the sheet-like member where the convex shapes are formed is cut into a predetermined size to obtain the first optical layer 221 and the third optical layer 223.

In this manner, in a case where the convex shapes 221a and the convex shapes 223a are formed in the same shape, the first optical layer 221 and the third optical layer 223 can be simultaneously cut out from one sheet-like member, and thus, it is possible to improve the manufacturing efficiency of the optical sheet 220.

Subsequently, the surface of the first optical layer 221 on the convex shape 221a side is filled with a resin for forming the second optical layer 222, the resin and the surface of the third optical layer 223 on the convex shape 223a side are attached with each other, and the resin is cured in a state where a predetermined distance is provided between the first optical layer 221 and the third optical layer 223. At this time, the first optical layer 221 and the third optical layer 223 are arranged so that an extending direction of the convex shapes 221a intersects (is orthogonal to) an extending direction of the convex shapes 223a.

In this manner, the optical sheet 220 where the first optical layer 221, the second optical layer 222, and the third optical layer 223 are sequentially laminated is completed.

Next, a plurality of optical sheets having different diffusion angles γ are prepared, and evaluation results of images displayed by display devices (Examples 1 to 3 and Comparative Examples 1 and 2) using the optical sheets are summarized below.

FIG. 11 is a diagram illustrating the results of visual evaluation of the images displayed on the display devices according to the examples and the comparative examples.

The optical sheet used for the display device according to each example and each comparative example is formed in the same manner as the optical sheet illustrated in FIGS. 8A to 8C described above. Accordingly, each convex shape has a cross-sectional shape of an isosceles triangle shape in the cross section parallel to the thickness direction and to the arrangement direction.

In addition, the first optical layer constituting the optical sheet is made of an epoxy acrylate based UV curable resin, the second optical layer is made of a urethane acrylate based UV curable resin, the third optical layer is made of an epoxy acrylate based UV curable resin. The difference $\Delta n1$ in refractive index between the first optical layer and the second optical layer and the difference $\Delta n2$ in refractive index between the second optical layer and the third optical layer are $\Delta n1=\Delta n2=0.06$ (the refractive indexes of the first optical layer and the third optical layer are each 1.56 and the refractive index of the second optical layer is 1.50).

In addition, in the image source used for the display device according to each example and each comparative example, the arrangement pitch of pixel regions is d=0.0508 mm (500 ppi (pixel per inch)), and the distance from the display surface of the image source 211 to the eye E of the viewer is D=50 mm. Therefore, the above-described Mathematical Formula (1) results in 0.058 degrees≤γ≤0.175 degrees.

In an optical sheet used for a display device according to Comparative Example 1, the arrangement pitches of the convex shapes are P1=P2=0.2 mm, the vertex angles of the convex shapes are θ1=θ2=178 degrees, and the diffusion angle at which the luminance is 1/10 of the maximum luminance is γ=0.039 degrees. Herein, in the display device according to Comparative Example 1, the diffusion angle γ is smaller than the lower limit value (arctan (d/D)=0.058 degrees) of the above-mentioned preferable range (Mathematical Formula (1)).

In an optical sheet used for a display device according to Comparative Example 2, the arrangement pitches of the convex shapes are P1=P2=0.2 mm, the vertex angles are θ1=θ2=170 degrees, and the diffusion angle at which the luminance is 1/10 of the maximum luminance is γ=0.193 degrees. Herein, in the display device according to Comparative Example 2, the diffusion angle γ is larger than the upper limit value (3×arctan (d/D)=0.175 degrees) of the above-described preferable range (Mathematical Formula (1)).

In an optical sheet used for a display device according to Example 1, the arrangement pitches of the convex shapes are P1=P2=0.2 mm, the vertex angles are θ1=θ2=177 degrees, and the diffusion angle at which the luminance is 1/10 of the maximum luminance is γ=0.058 degrees. Herein, in the display device according to Example 1, the diffusion angle γ is equal to the lower limit value (arctan (d/D)=0.058 degrees) of the above-described preferable range (Mathematical Formula (1)).

In an optical sheet used for a display device according to Example 2, the arrangement pitches of the convex shapes are P1=P2=0.2 mm, the vertex angles are θ1=θ2=175 degrees, and the diffusion angle at which the luminance is 1/10 of the maximum luminance is γ=0.120 degrees. Herein, in the display device according to Example 2, the diffusion angle γ is equal to an intermediate value (2×arctan (d/D)=0.120 degrees) between the lower limit value and the upper limit value of the above-described preferable range (Mathematical Formula (1).

In an optical sheet used for a display device according to Example 3, the arrangement pitches of the convex shapes are P1=P2=0.2 mm, the vertex angles are θ1=θ2=171 degrees, and the diffusion angle at which the luminance is 1/10 of the maximum luminance is γ=0.175 degrees. Herein, in the display device according to Example 3, the diffusion angle γ is equal to the upper limit value (3×arctan (d/D)=0.175 degrees) of the above-described preferable range (Mathematical Formula (1)).

An image is displayed on the display device according to each comparative example and each example, and evaluation results of visual evaluation of the displayed image by an evaluator are summarized in FIG. 11.

In FIG. 11, "⊙" in the visual evaluation indicates a case where the blur of the image is very small and the non-image regions caused by the non-pixel regions of the image source are inconspicuous, so that the display device is determined to be usable as a product.

In addition, "O" in the visual evaluation indicates a case where the blur of the image is slightly recognized and the non-image regions are sufficiently inconspicuous, so that the display device is determined to be sufficiently usable as a product or a case where the non-image regions are slightly visually recognized but the blur of the image is very small, so that the display device is determined to be sufficiently usable as a product.

In addition, "X" in the visual evaluation indicates a case where the blur of the image is recognized or the non-image region is conspicuous, so that the display device is determined not to be usable as a product.

As illustrated in FIG. 11, the display device according to Comparative Example 1, in which the non-image regions caused by the non-pixel regions cannot be made sufficiently inconspicuous, is given the visual evaluation of "X".

In addition, the display device according to Comparative Example 2, in which the blur of the image occurs and the sharpness of the image is deteriorated, is given the visual evaluation of "X".

In contrast, the display device according to Example 1, in which the blur of the image is very small although the non-image regions are slightly recognized visually, is given the visual evaluation of "O".

In addition, the display device according to Example 2, in which the blur of the image is very small and the non-image regions caused by the non-pixel regions of the image source are inconspicuous, is given the visual evaluation of "⊙".

The display device according to Example 3, in which the non-image regions is sufficiently inconspicuous although the blur of the image is slightly recognized, is given the visual evaluation of "O".

From the above results, the display devices according to the comparative examples each of which the visual evaluation is "X" do not satisfy the range of the above-described Mathematical Formula (1), whereas the display devices according to the examples each of which the visual evaluation is "⊙" or "O" satisfy the range of the above-described Mathematical Formula (1). Therefore, it is demonstrated that the display device can reduce the blur of the image and can make the non-image regions caused by the non-pixel regions of the image source inconspicuous by satisfying the above Mathematical Formula (1).

Next, other forms of the convex shapes provided in the optical sheet will be described.

Figure 12A:
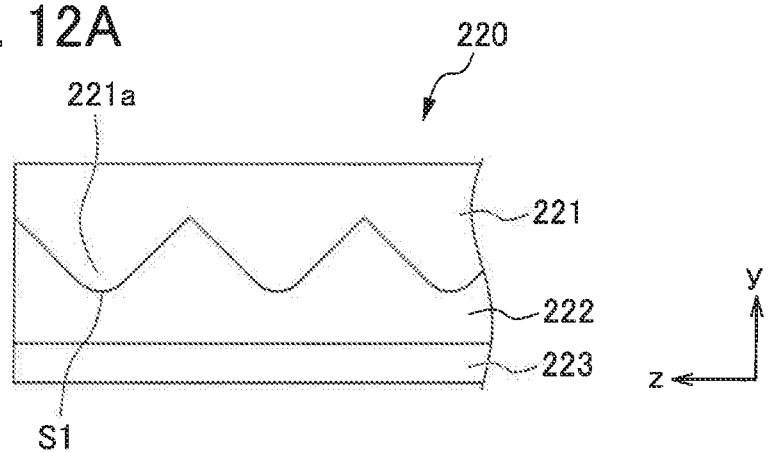
FIGS. 12A to 12C are each a diagram illustrating other forms of convex shapes provided in the optical sheet according to the second embodiment.
Figure 12B:
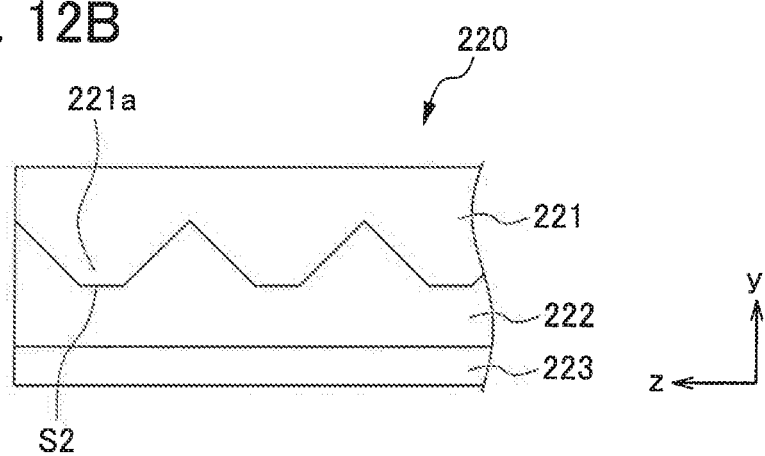
Figure 12C:
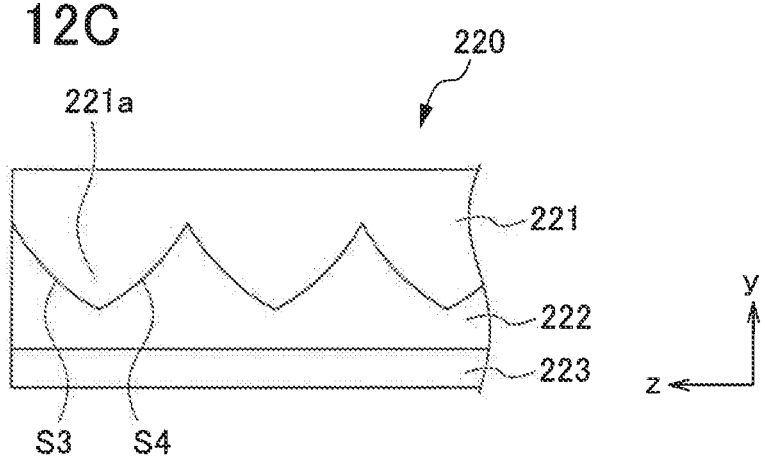

FIGS. 12A to 12C are each a diagram illustrating another form of convex shapes provided in the optical sheet. Each of FIGS. 12A to 12C corresponds to FIG. 9A. In addition, FIGS. 12A to 12C each illustrates another form of the convex shapes 221a of the first optical layer 221, but the same is applied for the convex shapes 223a of the third optical layer 223.

In the above description, the example has been described where each of the convex shapes 221a and 223a provided in the respective optical layers 221 and 223 has the cross-sectional shape of an isosceles triangle shape in the cross section parallel to the thickness direction of the optical sheet 220 and to the arrangement direction of the convex shapes, but the invention is not limited thereto.

For example, the vertex of the triangular shape in the same cross section may be formed to have a curved surface s1 as illustrated in FIG. 12A, or the vertex of the triangular shape may be formed to have a flat surface s2 as illustrated in FIG. 12B.

In addition, as illustrated in FIG. 12C, the inclined surface of the triangular shape in the same cross section may be formed as curved surfaces s3 and s4 which are slightly curved instead of flat surfaces.

In this manner, even in a case where each convex shape of each optical layer has such a configuration as described above, each optical sheet can exhibit the same effect as the optical sheet illustrated in FIGS. 8A to 8C.

Next, other forms of the optical sheet used for the display device will be described.

Figure 13A:
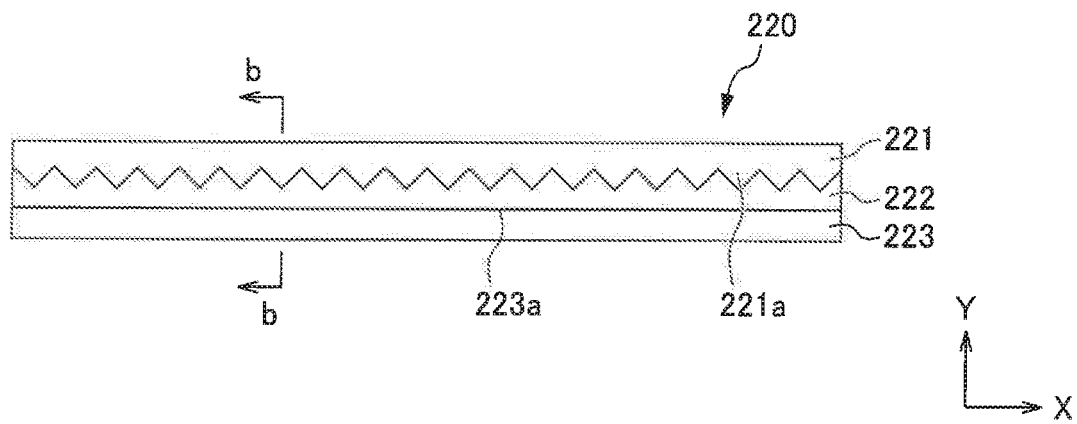
FIGS. 13A and 13B are each a diagram describing other forms of the optical sheet used for the display device according to the second embodiment.
Figure 13B:
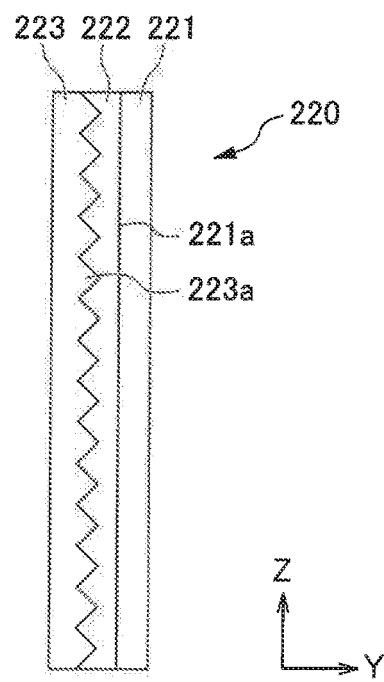

FIGS. 13A and 13B are each a diagram describing another form of the optical sheet used for the display device. FIG. 13A is a cross-sectional diagram in a cross section (XY cross section) parallel to a thickness direction (Y direction) and parallel to a horizontal direction (X direction), and FIG. 13B is a cross-sectional diagram in a cross section (YZ cross section) parallel to a thickness direction (Y direction) and parallel to a vertical direction (Z direction).

Figure 14A:
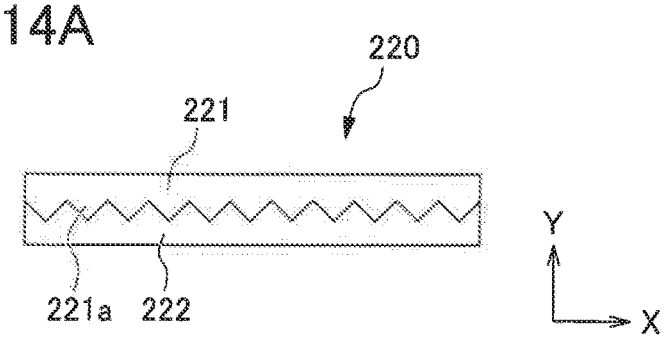
FIGS. 14A to 14C are each a diagram describing other forms of the optical sheet used for the display device according to the second embodiment.
Figure 14B:
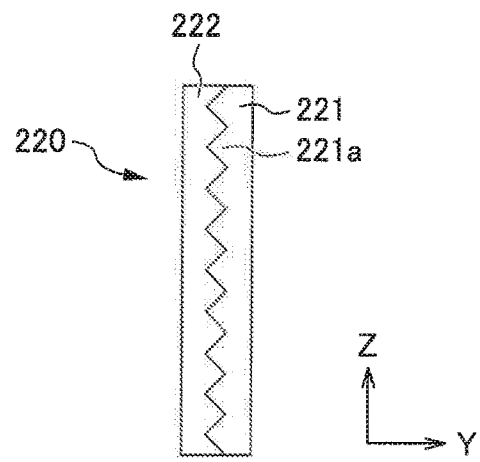
Figure 14C:
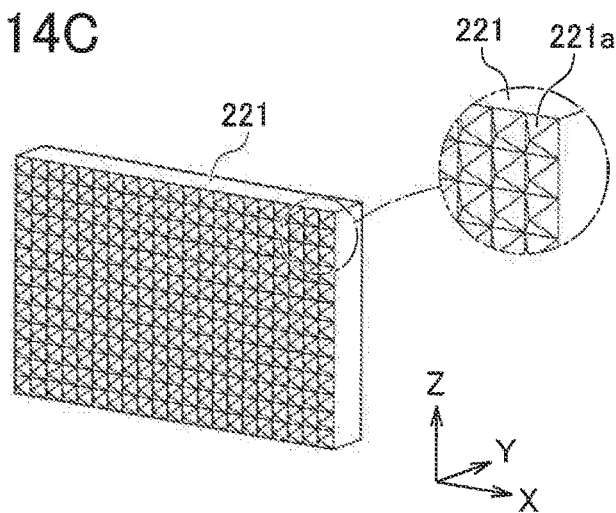

FIGS. 14A to 14C are each a diagram describing another form of the optical sheet used for the display device. FIG. 14A is a cross-sectional diagram in a cross section (XY cross section) parallel to a thickness direction (Y direction) and parallel to a horizontal direction (X direction), and FIG. 14B is a cross-sectional diagram in a cross section (YZ cross section) parallel to a thickness direction (Y direction) and parallel to a vertical direction (Z direction). FIG. 14C is a perspective diagram of a first optical layer as viewed from a viewer side.

In the above description, an example of the optical sheet 220 has been described: The convex shapes 221a extend in the x direction inclined by 45 degrees with respect to the horizontal direction (X direction) and are arranged plurally in the z direction inclined by 45 degrees with respect to the vertical direction (Z direction); and the convex shapes 223a extend in the z direction inclined by 45 degrees with respect to the vertical direction (Z direction) and are arranged plurally in the x direction inclined by 45 degrees with respect to the horizontal direction (X direction). However, the invention is not limited to the example.

For example, the optical sheet 220 may be configured such that: the convex shapes 221a extend in the vertical direction (X direction) and are arranged plurally in the horizontal direction (X direction) as illustrated in FIG. 13A; and the convex shapes 223a extend in the horizontal direction (X direction) and are arranged plurally in the vertical direction (Z direction) as illustrated in FIG. 13B. Even in a case where the optical sheet has such a configuration, similarly to the above-described embodiment, the image light emitted from the image source 211 is slightly diffused, and it is possible to prevent the non-image regions caused by the non-pixel regions from being visually recognized by the viewer as illustrated in FIG. 4 by the diffused image light.

In addition, as illustrated in FIGS. 14A to 14C, the optical sheet 220 may have a configuration including two layers of a first optical layer and a second optical layer, and convex shapes 221a each having a substantially quadrangular pyramid shape may be arranged plurally on a viewer side (−Y side) surface of the first optical layer without gaps in the vertical direction and the horizontal direction. Herein, the substantially quadrangular pyramid shape denotes not only a shape of a perfect quadrangular pyramid but also a shape where the vertex of a quadrangular pyramid is chamfered into a curved surface or a flat surface, a shape where each triangular inclined surface of a quadrangular pyramid is slightly curved, and the like. In addition, the convex shapes 221a each having a substantially quadrangular pyramid shape illustrated in FIGS. 14A to 14C may be arranged in a direction inclined (for example, inclined by 45 degrees) with respect to the vertical direction and the horizontal direction.

Even in a case where the optical sheet has such a configuration illustrated in FIGS. 14A to 14C, the image light emitted from the image source 211 is slightly diffused. Accordingly, it is possible to prevent the non-image regions caused by the non-pixel regions from being visually recognized by the viewer by the diffused image light as illustrated in FIG. 4. In addition, as compared with the embodiment illustrated in FIGS. 8A to 8C described above, the layer structure can be modified to reduce the number of layers, and thus, the optical sheet can be made thinner and lighter. As a result, the optical sheet can be more easily and inexpensively manufactured.

As described above, the display device 201 according to this embodiment is formed so that the optical sheet 220 having a layer structure of at least two or more layers and having a plurality of convex shapes formed at the interface between the layers is provided and the diffusion angle γ of the optical sheet 220 at which the luminance is 1/10 of the maximum luminance satisfies arctan (d/D)≤γ≤3×arctan (d/D). In this manner, the display device 201 can slightly diffuse the image light emitted from the image source 211 in the x-direction and the z-direction, so that the display device can display a sharp image on the viewer side and can prevent the non-image regions caused by the non-pixel regions of the image source 211 from being visually recognized by the viewer.

In addition, in the display device 201 according to this embodiment, the convex shapes 221a extend in the x direction (first direction) in the sheet surface (xz plane) orthogonal to the thickness direction (y direction) of the optical sheet 220 and are arranged in the z direction (second direction) orthogonal to the x direction in the sheet surface, and the convex shapes 221a each have the cross-sectional shape of a triangular shape at a cross section (yz plane) parallel to the thickness direction and to the z direction (second direction) of the optical sheet 220. Similarly, the convex shapes 223a extend in the z direction in the sheet surface (xz plane) orthogonal to the thickness direction (y direction) of the optical sheet 220 and are arranged in the x direction orthogonal to the z direction in the sheet surface.

And the convex shapes 223a has the cross-sectional shape of a triangular shape at a cross section (xy plane) parallel to the thickness direction and to the x direction of the optical sheet 220. Accordingly, the display device 201 can more clearly and uniformly diffuse the image light passing through the convex shapes.

In addition, in the display device 201 according to this embodiment, the optical sheet 220 has a layer structure of three or more layers, and the extending directions (the x direction and the z direction) of the convex shapes 221a and the convex shapes 223a provided at the interfaces between the layers in the sheet surface are orthogonal to (intersect) each other as viewed in the thickness direction of the optical sheet 220. Accordingly, the display device 201 can diffuse the image light emitted from the image source 211 in a plurality of directions (x direction and z direction), so that the non-image regions caused by the non-pixel regions of the image source 211 can be more effectively made inconspicuous.

Third Embodiment

Next, a display device 301 according to a third embodiment will be described.

In the following description and the drawings, components performing the same functions as those of the above-described first embodiment are denoted by the same reference numerals or suffixes (lower two digits), and redundant description is appropriately omitted.

Figure 15:
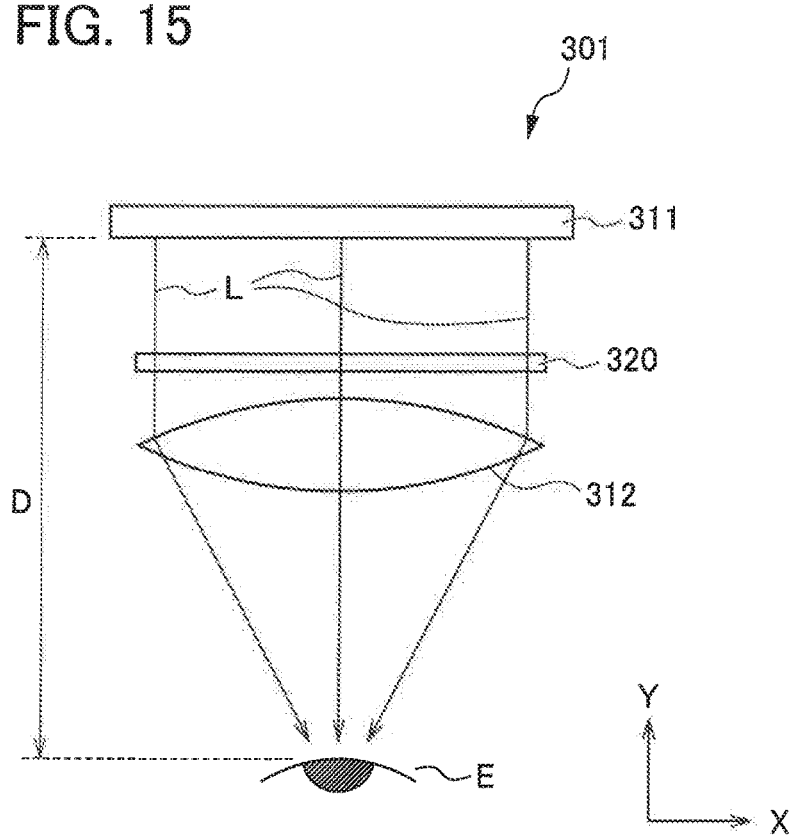
FIG. 15 is a diagram describing a configuration of a head mounted type display device according to a third embodiment.

FIG. 15 is a diagram describing the head mounted type display device 301 according to this embodiment. FIG. 15 is a diagram of the display device 301 as viewed from upside in a vertical direction.

As illustrated in FIG. 15, the display device 301 according to this embodiment is different from the display device 1 according to the above-described first embodiment in that an optical sheet 320 is provided instead of the optical sheet 20.

Figure 16A:
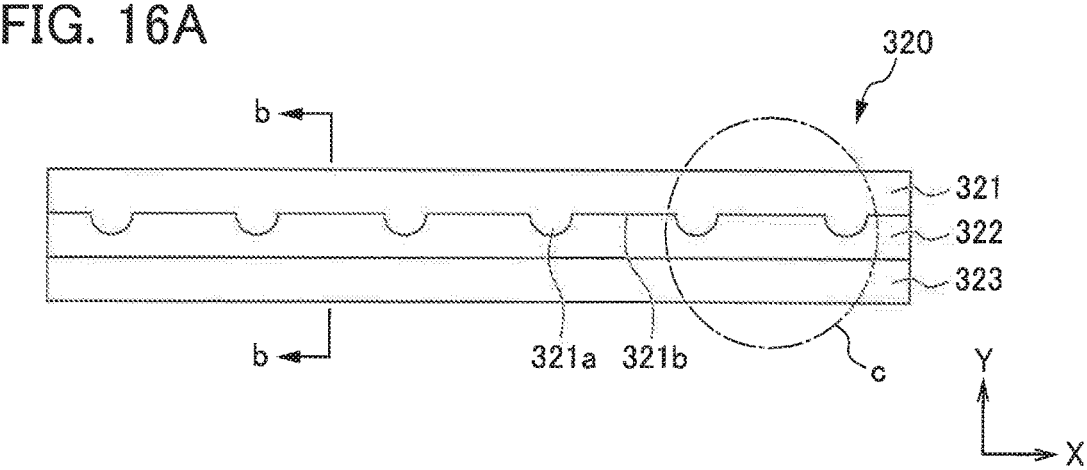
FIGS. 16A to 16D are each a diagram describing details of an optical sheet used for the display device according to the third embodiment.
Figure 16B:
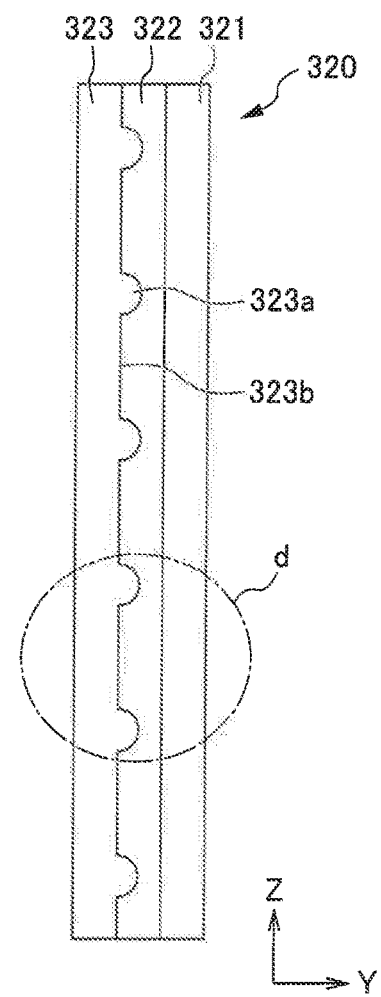
Figure 16C:
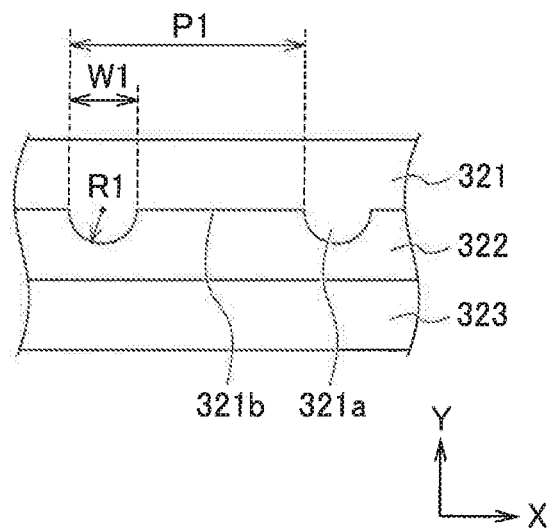
Figure 16D:
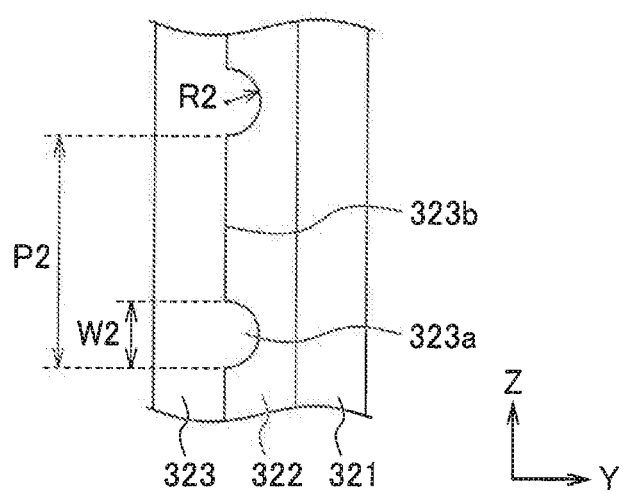

FIGS. 16A to 16D are each a diagram describing details of the optical sheet used for the display device according to this embodiment. FIG. 16A is a cross-sectional diagram taken at a plane parallel to a horizontal plane of the optical sheet, and FIG. 16B is a cross-sectional diagram of a portion b of FIG. 16A. FIG. 16C is a diagram illustrating details of a portion c in FIG. 16A, and FIG. 16D is a diagram illustrating details of a portion d in FIG. 16B.

Figure 17A:
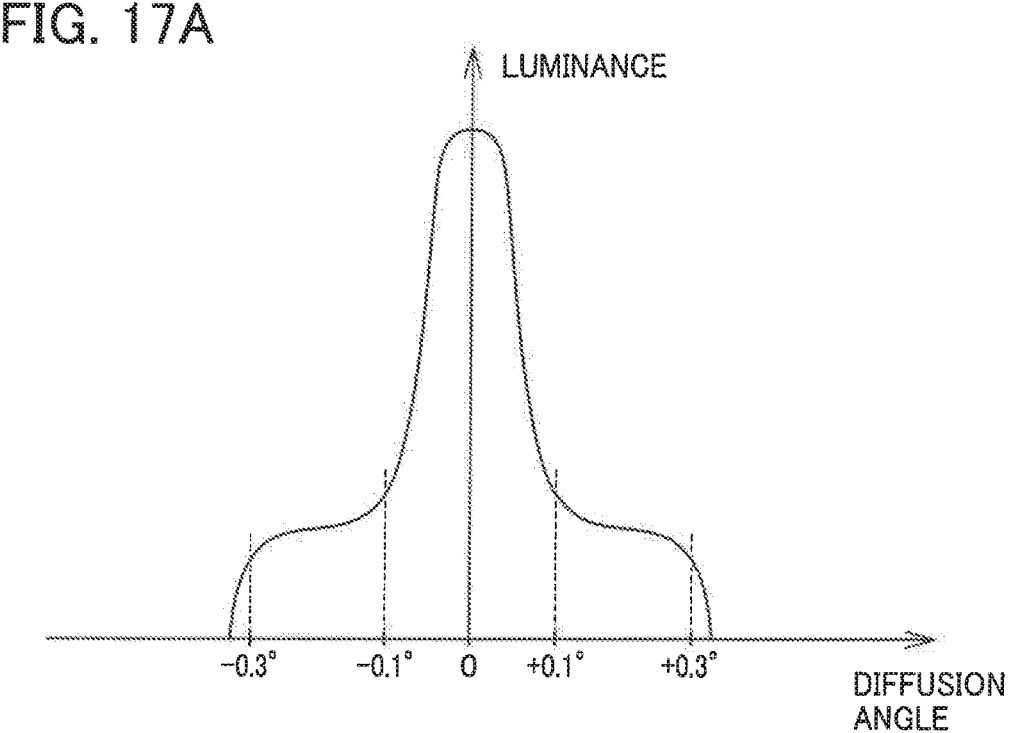
FIGS. 17A and 17B are each a diagram illustrating a relationship between luminance and a diffusion angle of the optical sheet used for the display device according to the third embodiment.
Figure 17B:
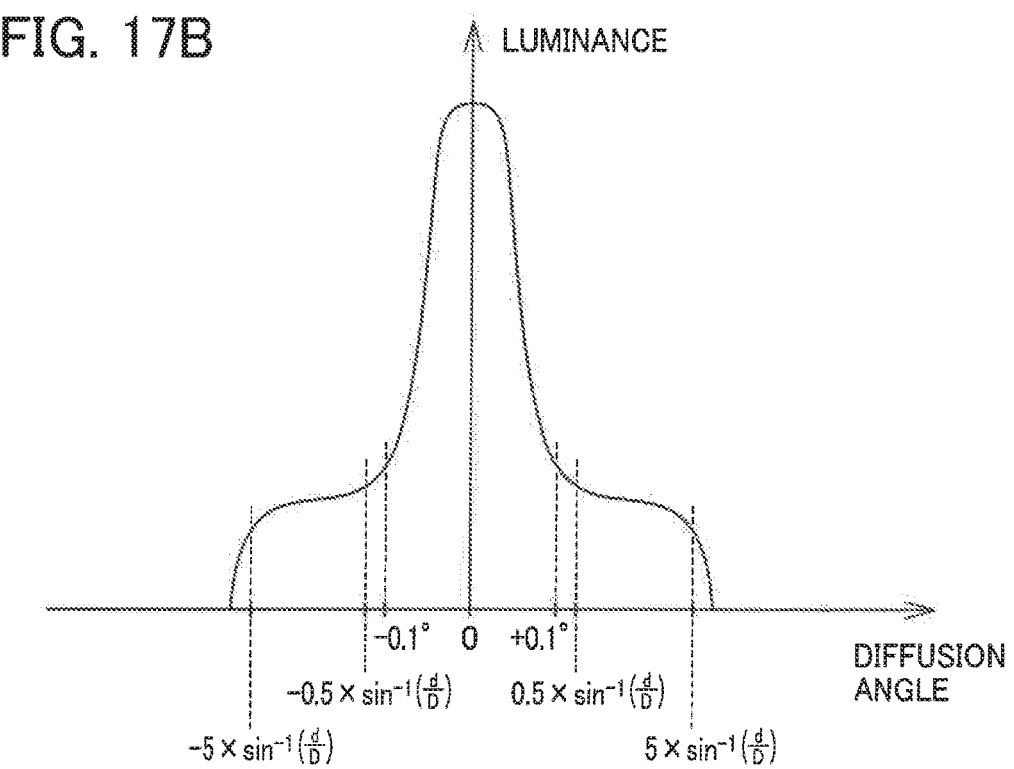

FIGS. 17A and 17B are each a diagram illustrating a relationship between luminance and a diffusion angle of the optical sheet used for the display device according to this embodiment. In FIGS. 17A and 17B, vertical axes each indicate a luminance of light, and horizontal axes each indicate a diffusion angle in a horizontal direction and a vertical direction of the optical sheet.

As illustrated in FIG. 15, the optical sheet 320 which is disposed between an image source 311 and a lens 312 at a position close to the lens 312 is a light-transmissive sheet having a diffusion function of slightly diffusing a portion of image light emitted from the image source 311.

In the optical sheet 320, as illustrated in FIGS. 16A to 16D, a first optical layer 321, a second optical layer 322, and a third optical layer 323 are laminated in order from a back side (+Y side). In the optical sheet 320, a plurality of unit shapes 321a are formed at an interface between the first optical layer 321 and the second optical layer 322. And a plurality of unit shapes 323a are formed at an interface between the second optical layer 322 and the third optical layer 323.

The first optical layer 321 is a light-transmissive layer located on the utmost back side (+Y side) of the optical sheet 320, and a back side surface of the first optical layer 321 is a substantially flat surface on which image light emitted from the image source 311 is incident. As illustrated in FIG. 16A, the unit shapes 321a and flat portions 321b are alternately formed on a viewer side (−Y side) surface of the first optical layer 321. The unit shapes 321a and the flat portions 321b extend in the vertical direction (Z direction) along the viewer side surface of the first optical layer 321, and are arranged plurally in the horizontal direction (X direction).

The third optical layer 323 is a light-transmissive layer located on the utmost viewer side (−Y side) of the optical sheet 320, and a viewer side surface of the third optical layer 323 is a substantially flat surface from which the image light passing through the optical sheet 320 is emitted. As illustrated in FIG. 16B, the plurality of unit shapes 323a and a plurality of flat portions 323b are alternately formed on a back side (+Y side) surface of the third optical layer 323. The unit shapes 323a and the flat portions 323b extend in the horizontal direction (X direction) along the back side surface of the third optical layer 323, and are arranged plurally in the vertical direction (Z direction).

That is, an extending direction (X direction) of the unit shapes 323a and the flat portions 323b provided in the third optical layer 323 intersects (is orthogonal to) an extending direction (Z direction) of the unit shapes 321a and the flat portions 321b provided in the above-described first optical layer 321.

The second optical layer 322 is a light-transmissive layer provided between the first optical layer 321 and the third optical layer 323, and a surface of the first optical layer 321 on a unit shape 321a side and a surface of the third optical layer 323 on a unit shape 323a side are disposed to face each other.

As the optical sheet is formed as described above, the display device 301 can emit the light passing through the flat portions 321b and the flat portions 323b directly to the viewer side out of the light emitted from the image source 311. In addition, the display device 301 can diffuse the light incident on the unit shapes 321a in the horizontal direction and the light incident on the unit shape 323a in the vertical direction, and emit the diffused light to the viewer side. In this manner, the display device 301 can display a sharp image on the viewer side and can prevent non-image regions caused by non-pixel regions of the image source 311 from being conspicuous due to slight diffusion of the image light. In particular, since the light passing through the flat portions 321b and the flat portions 323b is scarcely diffused, the image light reaching a viewer can be more clearly displayed.

Optical Properties of Optical Sheet

Herein, in order to effectively exhibit the above-mentioned effect, as illustrated in FIG. 17A, the optical sheet 320 according to this embodiment is formed so that, when the diffusion angle in the horizontal direction and the vertical direction of the optical sheet is in a range of −0.1° or more and 0.1° or less, the luminance of the light is close to the maximum luminance, and when the diffusion angle is in a range of 0.1° or more and 0.3° or less and a range of −0.3° or more and −0.1° or less, a predetermined luminance is maintained.

More specifically, the optical sheet 320 is formed so that an amount of transmitted light at the diffusion angle in the horizontal direction and the vertical direction which is in a range of −0.1° or more and 0.1° or less is set to be 30% or more of a total amount of transmitted light passing through the optical sheet 320, and an amount of transmitted light at the diffusion angle in the horizontal direction and the vertical direction which is in a range of −0.3° or more and 0.3° or less is set to be 95% or more of the total amount of transmitted light passing through the optical sheet 320.

Furthermore, the optical sheet 320 is formed so that an amount of transmitted light at the diffusion angle in the horizontal direction and the vertical direction of the optical sheet 320 which is in a range of 0.1° or more and 0.3° or less is 20% or more of the total amount of transmitted light passing through the optical sheet 320, and an amount of transmitted light at the diffusion angle which is in a range of −0.3° or more to −0.1° or less is 20% or more of the total amount of transmitted light passing through the optical sheet 320.

Herein, the diffusion angle of the optical sheet 320 denotes an observation angle in the horizontal direction of a screen and the vertical direction of the screen from an observation position of a sheet surface of the optical sheet 320 at which the luminance of the light has the maximum value.

In this manner, by specifying the amount of transmitted light of which the diffusion angle is in a specific range of the diffusion angle of the optical sheet 320, the display device 301 according to this embodiment can transmit light incident on the flat portions among the image light emitted from the image source 311 without almost any diffusion and can slightly diffuse light incident on respective unit shapes in the vertical direction and the horizontal direction. Accordingly, the display device 301 can display a sharp image on the viewer side and can prevent the non-image regions caused by the non-pixel regions of the image source 311 from being conspicuous due to slight diffusion of the image light. In particular, since the light passing through the flat portions 321b and the flat portions 323b is scarcely diffused, it is possible to transmit a sharper image to the viewer, and it is possible to prevent the blur of the image from occurring as much as possible.

It may not be preferable if the amount of transmitted light at the diffusion angle of −0.1° or more and 0.1° or less is less than 30% of the total amount of transmitted light passing through the optical sheet 320. The reason for this is that the amount of light reaching the viewer side becomes too small, and thus, the sharpness of the image is lost, and the image is blurred.

In addition, it may not be preferable if the amount of transmitted light at the diffusion angle of −0.3° or more and 0.3° or less is less than 95% of the total amount of transmitted light passing through the optical sheet 320. The reason for this is that the amount of light of the image reaching the viewer side becomes too small, and thus the image becomes dark.

In addition, it may not be preferable if the amount of transmitted light at the diffusion angle of 0.1° or more and 0.3° or less and the amount of transmitted light at the diffusion angle of −0.3° or more and −0.1° or less are less than 20% of the total amount of transmitted light passing through the optical sheet 320. The reason for this is that the slight diffusion of the image light due to the unit shapes becomes too small, and thus, the non-image regions caused by the non-pixel regions of the image source 11 becomes conspicuous.

Other Optical Properties of Optical Sheet

In addition, as other optical properties for effectively exhibiting the above effect, as illustrated in FIG. 17B, the optical sheet 320 according to this embodiment may be formed so that the luminance of light is close to the maximum luminance when the diffusion angle in the horizontal direction and the vertical direction of the optical sheet is in a range of −0.1° or more and 0.1° or less, and a predetermined luminance is maintained when the diffusion angle is in a range of $0.5 \times \sin^{-1}$ (d/D) or more and $5 \times \sin^{-1}$ (d/D) or less and in a range of $-5 \times \sin^{-1}$ (d/D) or more and $-0.5 \times \sin^{-1}$ (d/D) or less.

More specifically, the optical sheet is formed so that the amount of transmitted light at the diffusion angle in a range of −0.1° or more and 0.1° or less in the horizontal direction and the vertical direction is 30% or more of the total amount of transmitted light passing through the optical sheet 320.

In addition, in a case where an arrangement pitch of the pixel regions of the image source 311 is denoted by d and a distance from the display surface of the image source 311 to the eye of the viewer wearing the display device 301 is denoted by D, the optical sheet 320 is formed so that an amount of transmitted light at the diffusion angle in a range of $-5 \times \sin^{-1}$ (d/D) or more and $5 \times \sin^{-1}$ (d/D) or less in the horizontal direction and the vertical direction is 95% or more of the total amount of transmitted light passing through the optical sheet 320.

In addition, the optical sheet 320 is formed so that an amount of transmitted light at the diffusion angle in the horizontal direction and the vertical direction which is in a range of $0.5 \times \sin^{-1}$ (d/D) or more and $5 \times \sin^{-1}$ (d/D) or less is 20% or more of the total amount of transmitted light passing through the optical sheet 320, and an amount of transmitted light at the diffusion angle which is in a range of $-5 \times \sin^{-1}$ (d/D) or more and $-0.5 \times \sin^{-1}$ (d/D) or less is 20% or more of the total amount of transmitted light passing through the optical sheet 320.

In this manner, even when an amount of transmitted light in a specific range of the diffusion angle of the optical sheet 320 is defined by the arrangement pitch d of the pixel regions and the distance D, the display device 301 according to this embodiment can transmit the light incident on the flat portions among the image light emitted from the image source 311 without almost any diffusion and can slightly diffuse the light incident on the respective unit shapes in the vertical direction and the horizontal direction. Therefore, the display device 301 can display a sharp image on the viewer side and can prevent the non-image regions caused by the non-pixel regions of the image source 311 from being conspicuous due to slight diffusion of the image light. In addition, since a specific range of the diffusion angle can be appropriately defined in accordance with the specification (arrangement pitch d, distance D) of the display device 301, as compared with the above-described cases, a sharp image can be more efficiently displayed, and prevention of visual recognition of the non-pixel regions can be realized.

Herein, it may not be preferable if the amount of transmitted light at the diffusion angle of $-5 \times \sin^{-1}$ (d/D) or more and $5 \times \sin^{-1}$ (d/D) or less is less than 95% of the total amount of transmitted light passing through the optical sheet 320. The reason for this is that the amount of light of the image reaching the viewer side becomes too small, and thus, the image becomes dark.

In addition, it may not be preferable if the amount of transmitted light at the diffusion angle of $0.5 \times \sin^{-1}$ (d/D) or more and $5 \times \sin^{-1}$ (d/D) or less and the amount of transmitted light at the diffusion angle of $-5 \times \sin^{-1}$ (d/D) or more and $-0.5 \times \sin^{-1}$ (d/D) or less are less than 20% of the total amount of transmitted light passing through the optical sheet 320. The reason for this is that the slight diffusion of the image light according to the unit shapes becomes too small, and thus, the non-image regions caused by the non-pixel regions of the image source 311 becomes conspicuous.

It may be preferable that the optical sheet 320 according to this embodiment is formed so that the difference in refractive index between the adjacent layers, that is, a difference Δn1 in refractive index between the first optical layer 321 and the second optical layer 322 and a difference Δn2 in refractive index between the second optical layer 322 and the third optical layer 323 satisfy 0.005≤Δn1≤0.1 and 0.005≤Δn2≤0.1, respectively. Accordingly, the refraction angle of light at the interface of adjacent layers can be adjusted, so that it is possible to optimize an amount of light diffused in the unit shapes.

It may not be preferable if the differences (Δn1, Δn2) in refractive index between the adjacent layers are less than 0.005. The reason for this is that the differences in refractive index between the respective layers become too small, and thus, the refraction of the image light between the respective layers becomes difficult to occur, so that a sufficient diffusion function cannot be exhibited. In addition, it may not be preferable if the differences (Δn1, Δn2) in refractive index between the adjacent layers are larger than 0.1. The reason for this is that the refraction of light between the respective layers becomes too large, so that the image light passing through the optical sheet becomes unclear.

Configuration of Unit Shape

In order to realize the optical properties as described above, in this embodiment, as illustrated in FIG. 16C, each unit shape 321a is formed to be convex from the viewer side surface (the −Y side surface) of the first optical layer 321, and to have the cross-sectional shape of a substantially arc shape in the XY cross section. Herein, the substantially arc shape denotes not only an arc of a true circle but also a curved shape including a portion of an ellipse, an oval, or the like.

Each unit shape 321a according to this embodiment is formed in an arc shape, a radius of curvature thereof is formed to be R1, and a width dimension in the horizontal direction (X direction) is formed to be w1. An arrangement pitch in the horizontal direction of the unit shapes 321a (the flat portions 321b) is formed to be P1.

Similarly, as illustrated in FIG. 16D, each unit shape 323a is formed to be convex from the back side surface (the +Y side surface) of the third optical layer 323, and to have the cross-sectional shape of a substantially arc shape in the YZ cross section. Each unit shape 323a according to this embodiment is formed in an arc shape, a radius of curvature thereof is formed to be R2, and a width dimension in the vertical direction (Z direction) is formed to be w2. An arrangement pitch in the vertical direction of the unit shapes 323a (the flat portions 323b) is formed as P2.

The respective unit shapes and the respective flat portions provided in the first optical layer 321 and the third optical layer 323 according to this embodiment are formed to have the same size, for example, w1=w2=100 μm, P1=P2=240 μm, and R1=R2=500 μm.

Herein, it may be preferable that the arrangement pitch P1 and the arrangement pitch P2 of the respective unit shapes are 100 μm≤P1≤500 μm.

It may not be preferable if P1 and P2 are less than 100 μm, since the arrangement interval of the unit shapes becomes too small, and the influence of the diffracted light becomes large, so that the image becomes unclear. In addition, it may not be preferable if P1 and P2 are larger than 500 μm, since the arrangement interval of the unit shapes becomes too large, so that the non-pixel regions is easily recognized visually.

Each of the first optical layer 321 and the third optical layer 323 is made of a PC (polycarbonate) resin, an MS (methyl methacrylate styrene) resin, an acrylic resin, or the like having high optical transparency, and in this embodiment, both the first optical layer 321 and the third optical layer 323 are made of the same material, so that the two optical layers have the same refractive index.

In addition, the second optical layer 322 is made of an UV curable resin such as a urethane acrylate resin or an epoxy acrylate resin, or the like having high optical transparency. And in this embodiment, the second optical layer 322 is formed to have a refractive index lower than the refractive indexes of the first optical layer 321 and the third optical layer 323.

Next, the operations until image light L emitted from the image source 311 reaches the eye E of the viewer will be described.

The image light L emitted from the image source 311 is incident on the back side (+Y side) surface of the optical sheet 320, passes through the first optical layer 321, and reaches the interface between the first optical layer 321 and the second optical layer 322. Among the light reaching this interface, light incident on the unit shapes 321a is slightly diffused in the horizontal direction (X direction) and passes through inside the second optical layer 322, and light incident on the flat portions 321b passes through inside the second optical layer 322 without almost any diffusion.

The image light passing through the second optical layer 322 reaches an interface between the second optical layer 322 and the third optical layer 323. Among the light reaching this interface, light incident on the unit shapes 323a is slightly diffused in the vertical direction (Z direction) and passes through the third optical layer 323 to be emitted from the viewer side (the −Y side) surface of the optical sheet 320, and light incident on the flat portions 323b is emitted from the viewer side surface of the optical sheet 320 without almost any diffusion.

Subsequently, the image light L emitted from the viewer side surface of the optical sheet 320 is incident on a lens 312 and is emitted to the eye E of the viewer. Herein, since a portion of the image light L emitted from the image source 311 is slightly diffused in the horizontal direction and the vertical direction by the optical sheet 320 as described above, it is possible to prevent the non-image regions caused by the non-pixel regions of the image source 311 from being conspicuous as much as possible in the image viewed by the eye E of the viewer as illustrated in FIG. 4 in comparison with the case of the display device according to the above-described comparative example (refer to FIG. 5B), although the image light L is enlarged by the lens 312. Accordingly, it is possible to display a sharp image. In addition, since the flat portions 321b and the flat portions 323b are provided in the respective optical layers, the light passing through the flat portions reaches the viewer side without almost any diffusion, so that the display device 301 can display a sharper image with less blur to the viewer.

Next, a method of manufacturing the optical sheet 320 used for the display device 301 according to this embodiment will be described.

As described above, since the unit shapes 321a and the unit shapes 323a provided on the first optical layer 321 and the third optical layer 323 of the optical sheet 320 are formed in the same shape, first, a sheet-like member where the unit shapes are formed is formed by a mold provided with concave shapes corresponding to the unit shapes through an extrusion molding method, an injection molding method, or the like.

Then, the sheet-like member where the unit shapes are formed is cut into a predetermined size to obtain the first optical layer 321 and the third optical layer 323. In this manner, in a case where each unit shape 321a and each unit shape 323a are formed in the same shape, the first optical layer 321 and the third optical layer 323 can be simultaneously cut out from one sheet-like member, and thus, it is possible to improve the manufacturing efficiency of the optical sheet 320.

Subsequently, the surface of the first optical layer 321 on the unit shape 321a side is filled with a resin for forming the second optical layer 322, and the resin and the surface of the third optical layer 323 on the unit shape 323a side are attached with each other, and the resin is cured in a state where a predetermined distance is provided between the first optical layer 321 and the third optical layer 323. At this time, the first optical layer 321 and the third optical layer 323 are arranged so that an extending direction of the unit shapes 321a intersects (is orthogonal to) an extending direction of the unit shapes 323a.

In this manner, the optical sheet 320 where the first optical layer 321, the second optical layer 322, and the third optical layer 323 are sequentially laminated is completed.

Next, other configurations of the optical sheet used for the display device will be described.

FIGS. 18A and 18B, FIGS. 19B and 19B and FIGS. 20A and 20B are diagrams describing other configurations of the optical sheet used for the display device. Each of FIGS. 18A, 19A and 20A corresponds to FIG. 16A, and each of FIGS. 18B, 19B and 20B corresponds to FIG. 16B.

In the above description, the example has been described where each unit shape 321a provided in the first optical layer 321 is formed to be convex from the viewer side surface (the −Y side surface) of the first optical layer 321 and to have the cross-sectional shape of an arc shape in the XY cross section, and each unit shape 323a provided in the third optical layer 323 is formed to be convex from the back side surface (the +Y side surface) of the third optical layer 323 and to have the cross-sectional shape of an arc shape in the YZ cross section, but the invention is not limited to this.

Figure 18A:
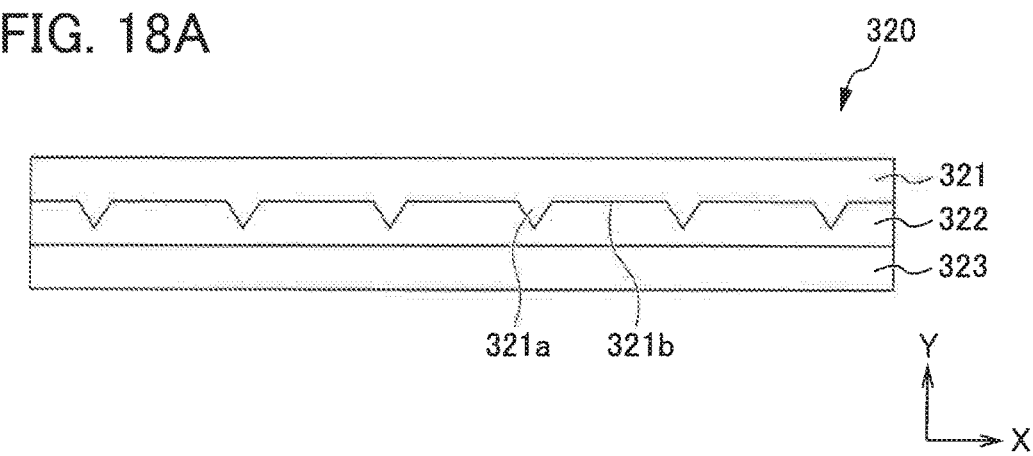
FIGS. 18A and 18B are each a diagram describing other forms of the optical sheet used for the display device according to the third embodiment.
Figure 18B:
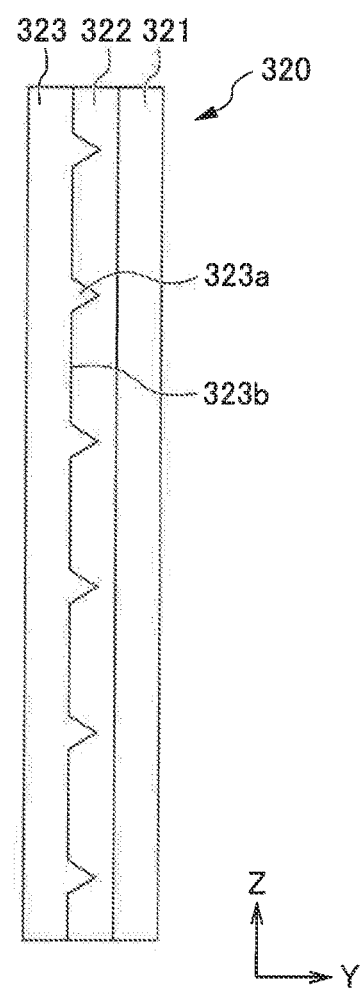

For example, as illustrated in FIGS. 18A and 18B, each unit shape 321a may be formed to be convex from the viewer side surface (the −Y side surface) of the first optical layer 321 and to have the cross-sectional shape of a triangular shape in the XY cross section, and each unit shape 323a may be formed to be convex from the back side surface (the +Y side surface) of the third optical layer 323 and to have the cross-sectional shape of a triangular shape in the YZ cross section.

Figure 19A:
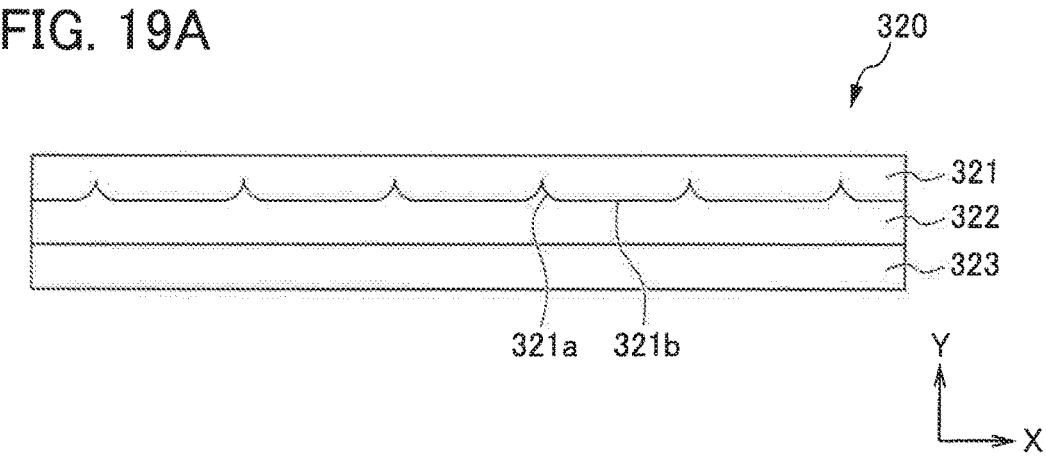
FIGS. 19A and 19B are each a diagram describing other forms of the optical sheet used for the display device according to the third embodiment.
Figure 19B:
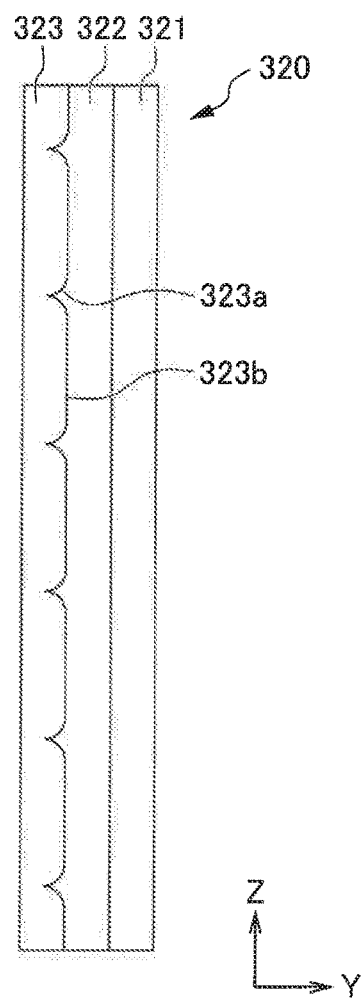

In addition, as illustrated in FIG. 19A, each unit shape 321a is a shape (concave shape) recessed from the viewer side surface (the −Y side surface) of the first optical layer 321, and two convex surfaces each of which the cross-sectional shape in the XY cross section is formed in an arc shape may be formed to face each other in the horizontal direction. Similarly, each unit shape 323a is a shape (concave shape) recessed from the back side surface (the +Y side surface) of the third optical layer 323, and two convex surfaces each of which the cross-sectional shape in the YZ cross section is formed in an arc shape may be formed to face each other in the vertical direction.

Figure 20A:
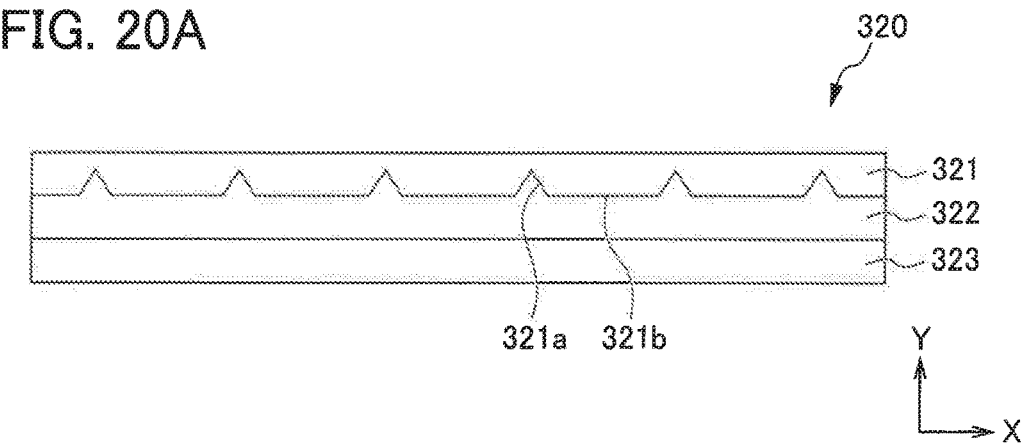
FIGS. 20A and 20B are each a diagram describing other forms of the optical sheet used for the display device according to the third embodiment.
Figure 20B:
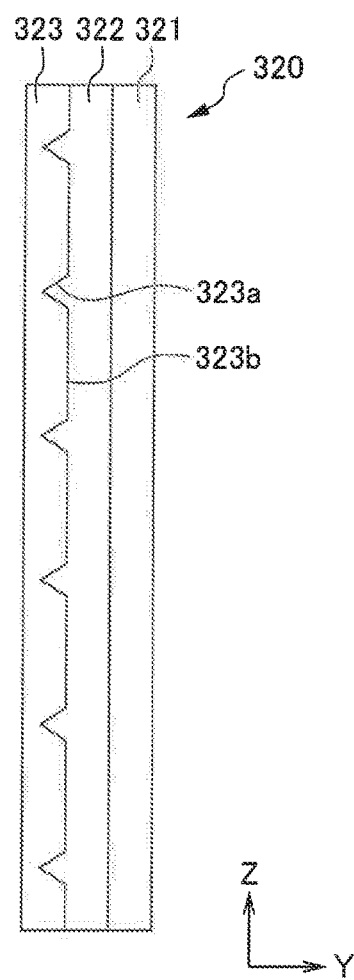

In addition, as illustrated in FIGS. 20A and 20B, each unit shape 321a may be formed to be a shape (concave shape) recessed from the viewer side surface (the −Y side surface)

of the first optical layer 321 and to have the cross-sectional shape of a triangular shape in the XY cross section, and each unit shape 323a may be formed to be a shape (concave shape) recessed from the back side surface (the +Y side surface) of the third optical layer 323 and to have the cross-sectional shape of a triangular shape in the YZ cross section.

Even in such an embodiment, similarly to the above-described embodiment (refer to FIGS. 16A and 16B), the display device 301 can transmit light passing through the flat portions 321b and the flat portions 323b among the light emitted from the image source 311 without almost any diffusion to the viewer side. In addition, the display device 301 can slightly diffuse light incident on the unit shapes 321a in the horizontal direction and light incident on the unit shapes 323a in the vertical direction to be emitted to the viewer side. Accordingly, the display device 301 can display a sharp image with less blur on the viewer side and can prevent the non-image regions caused by the non-pixel regions of the image source 311 from being conspicuous due to slight diffusion of the image light.

As described above, the display device 301 according to this embodiment has the optical sheet 320 which has a layer structure of at least two or more layers and where the plurality of unit shapes are formed at the interfaces between the layers. The amount of transmitted light at the diffusion angle in a range of −0.1° or more and 0.1° or less in the horizontal direction and the vertical direction of the optical sheet 320 is 30% or more of the total amount of transmitted light passing through the optical sheet 320. Also the amount of transmitted light at the diffusion angle in a range of −0.3° or more and 0.3° or less in the horizontal direction and the vertical direction of the optical sheet 320 is 95% or more of the total amount of transmitted light passing through the optical sheet 320.

Therefore, the display device 301 can slightly diffuse the image light emitted from the image source 311 in the vertical direction and the horizontal direction, so that the display device 301 can display a sharp image with little blur on the viewer side and can prevent the non-image regions caused by the non-pixel regions of the image source 311 from being visually recognized by the viewer.

In addition, in the display device 301 according to this embodiment, the amount of transmitted light at the diffusion angle in a range of 0.1° or more and 0.3° or less in the horizontal direction and the vertical direction of the optical sheet 320 is 20% or more of the total amount of transmitted light passing through the optical sheet 320, and the amount of transmitted light at the diffusion angle in a range of −0.3° or more and −0.1° or less in the horizontal direction and the vertical direction of the optical sheet 320 is 20% or more of the total amount of transmitted light passing through the optical sheet 320. Accordingly, it is possible for the display device 301 to efficiently prevent the non-image regions caused by the non-pixel regions of the image source 11 from being conspicuous.

Furthermore, it is possible for the display device 301 according to this embodiment to exhibit the same effect as described above, even in a case where: the amount of transmitted light at the diffusion angle in a range of −0.1° or more and 0.1° or less in the horizontal direction and the vertical direction of the optical sheet 320 is 30% or more of the total amount of transmitted light passing through the optical sheet 320; the amount of transmitted light at the diffusion angle in a range of $0.5 \times \sin^{-1}$ (d/D) or more and $5 \times \sin^{-1}$ (d/D) or less in the horizontal direction and the vertical direction of the optical sheet 320 is 20% or more of the total amount of transmitted light passing through the optical sheet 320; and the amount of transmitted light at the diffusion angle in a range of $-5 \times \sin^{-1}$ (d/D) or more and $-0.5 \times \sin^{\times 1}$ (d/D) or less in the horizontal direction and the vertical direction of the optical sheet 320 is 20% or more of the total amount of transmitted light passing through the optical sheet 320.

That is, the display device 301 can slightly diffuse the image light emitted from the image source 311 in the vertical direction and the horizontal direction, so that the display device 301 can display a sharp image with less blur on the viewer side and can prevent the non-image regions caused by the non-pixel regions of the image source 311 from being visually recognized by the viewer. In addition, since a specific range of the diffusion angle can be appropriately defined in accordance with the specification (arrangement pitch d, distance D) of the display device 301, a sharp image can be more efficiently displayed, and prevention of visual recognition of the non-pixel regions can be realized.

Furthermore, the display device 301 according to this embodiment is formed so that the differences in refractive index between the adjacent layers of the optical sheet 320, that is, the difference Δn1 in refractive index between the first optical layer 321 and the second optical layer 322 and the difference Δn2 in refractive index between the second optical layer 322 and the third optical layer 323 satisfy 0.005≤Δn1≤0.1 and 0.005≤Δn2≤0.1, respectively. As a result, by adjusting the refraction of the image light between the layers, it is possible to display a sharp image, and by obtaining a sufficient diffusion function, it is possible to more efficiently allow the non-image regions caused by the non-pixel regions of the image source 311 to be inconspicuous.

Although the embodiments of the invention have been described above, the invention is not limited to the above-described embodiments, and various modifications and changes can be made like modified embodiments to be described later, which are to be within the technical scope of the invention. In addition, the effects described in the embodiments are merely the most preferable effects exhibited by the invention, and the effects of the invention are not limited to those described in the embodiments. In addition, the above-described embodiments and later-described modifications may be combined as appropriate, but detailed description thereof will be omitted.

Modified Embodiment

Figure 6:
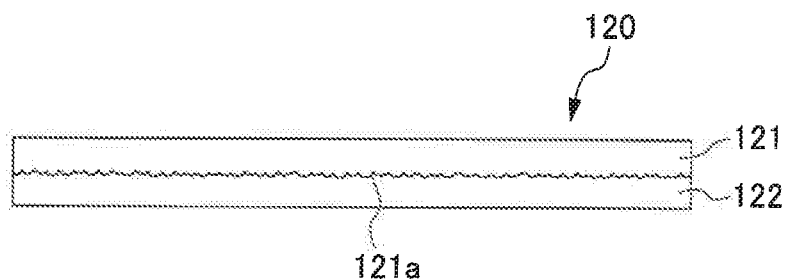
FIG. 6 is a diagram describing a modified embodiment of the optical sheet used for the display device according to the first embodiment.

FIG. 6 is a diagram describing a modified embodiment of the optical sheet used for the display device.

(1) In each of the above-described embodiments, an example has been described where the optical sheet 20 has a layer structure where three layers of the first optical layer 21, the second optical layer 22, and the third optical layer 23 are sequentially laminated, but the invention is not limited thereto. For example, as illustrated in FIG. 6, the optical sheet 120 may have a structure where two layers of the first optical layer and the second optical layer are laminated or may have a layer structure of four or more layers.

(2) In the above-described first embodiment, an example has been described where the lenticular lens shapes are formed at the interface between the layers of the optical sheet 20, and in the second embodiment, an example has been described where the prism shape is formed at the interface between the layers of the optical sheet 220. However, the invention is not limited thereto. For example, as illustrated in FIG. 6, the optical sheet 120 has a two-layer structure of the first optical layer 121 and the second optical layer 122, and fine convex shapes may be randomly formed between the first optical layer 121 and the second optical layer 122. Even in this configuration, the image light emitted from the image source can be slightly diffused by the optical sheet 120, and the display device can allow the non-image regions caused by the non-pixel regions of the image source 11 to be inconspicuous. In addition, in this case, as compared with the optical sheet used for the display device according to the above-described embodiments, the layer structure can be reduced, and thus, the optical sheet can be made thinner and lighter.

(3) In each of the above-described embodiments, the example has been described where the optical sheet 20 is disposed between the image source 11 and the lens 12, but the invention is not limited thereto, and the optical sheet 20 may be disposed on the viewer side (−Y side) of the lens 12. Even in such an embodiment, the display device 1 enlarges the image light emitted from the image source 11 with the lens 12 and thereafter slightly diffuses the image light, so that the image can be displayed with the non-image regions caused by the non-pixel regions of the image source 11 being inconspicuous. In addition, in this case, since the viewer side surface of the lens can be covered with the optical sheet, it is also possible to protect the lens from scratches and dirt by using the optical sheet.

In addition, an antifogging function layer having a defogging function (antifogging function) for suppressing fogging may be provided on a viewer side (−Y side) surface of the optical sheet 20, and it is possible to suppress the fogging of the optical sheet 20 caused by the body temperature or moisture of a wearer of the display device 1. The antifogging function layer is a layer formed of, for example, a surfactant.

Furthermore, by providing a hard coat layer having a hard coat function or an antifouling function layer having an antifouling function on the viewer side (−Y side) surface of the optical sheet 20, it may be possible to suppress the optical sheet 20 from being scratched or dirt from adhering thereto. The hard coat layer is a layer formed of, for example, an epoxy-based resin, and the antifouling function layer is a layer formed of, for example, a fluorine-based resin.

In addition, a reflection suppressing layer for suppressing reflection may be provided on the viewer side surface (surface on the −Y side) and/or the back surface (surface on the +Y side) of the optical sheet 20. For example, the reflection suppressing layer may be provided by coating the optical sheet 20 with a general-purpose material (for example, magnesium fluoride ($MgF_2$), silicon dioxide ($SiO_2$), fluorine-based optical coating agent, or the like) having a reflection suppressing function with a predetermined film thickness. Or a so-called moth-eye structure having minute concave-convex shapes formed at a pitch smaller than the wavelength of light may be provided at the optical sheet 20.

In a case where the reflection suppressing layer is provided on the back surface of the optical sheet 20, the light incident on the optical sheet 20 is reflected by the back surface of the optical sheet 20 to be directed toward the lens 12 and is reflected again by the lens 12, so that it is possible to prevent the light from being stray light, and thus, it is possible to improve the contrast and brightness of the image.

In a case where the reflection suppressing layer is provided on the viewer side surface of the optical sheet 20, when the light is emitted from the optical sheet 20, the light is reflected at the interface between the optical sheet 20 and the air, so that it is possible to prevent the light from being stray light in the optical sheet 20, and thus, it is possible to improve the contrast and brightness of the image.

In a case where minute concave-convex shapes (so-called moth-eye structure) are provided in the reflection suppressing layer on the back side (+Y side) of the optical sheet 20, the concave-convex shapes can be prevented from being touched by the wearer or the like of the display device 1 and from being damaged since the concave-convex shapes are interposed between the optical sheet and the lens 12.

In addition, it may be preferable that the distance between the optical sheet 20 and the eye E of the viewer in the Y direction is 100 times or more the arrangement pitch of the pixel regions of the image source 11. It may not be preferable if the distance between the optical sheet 20 and the eye E of the viewer is less than 100 times. The reason for this is that moiré (interference fringe) due to the pixel regions is visually recognized or non-image regions due to the non-pixel regions are easily observed conspicuously.

(4) In each of the embodiments described above, an example has been described where, in the optical sheet 20, the first optical layer 21 is disposed on the back side and the third optical layer 23 is disposed on the viewer side. However, the invention is limited thereto. The first optical layer 21 may be disposed on the viewer side, and the third optical layer 23 may be disposed on the back side.

(5) In the above-described first and third embodiments, an example has been described where, in the optical sheet 20, the extending direction of the convex shapes 21a is the vertical direction (Z direction), the extending direction of the convex shapes 23a is the horizontal direction (X direction), and the two extending directions are orthogonal to each other. However, the invention is not limited thereto. For example, the extending direction of the convex shapes 21a of the optical sheet 20 may be a direction inclined by 45° with respect to the horizontal direction, and the extending direction of the convex shapes 23a may be a direction inclined by −45° with respect to the horizontal direction. In addition, the extending directions of the convex shapes may be appropriately set depending on the arrangement of pixels of the image source 11 or the like. In addition, the extending directions of the convex shapes of the optical sheet 20 may be a direction inclined by an angle other than 45 degrees, for example, 15 degrees or 30 degrees with respect to the horizontal direction or the vertical direction. By setting the inclined direction in this manner, it may be possible to prevent the light of the adjacent pixel regions of the image source diffused by the optical sheet from mixing with each other between the pixel regions to become a conspicuous color different from the original color.

In addition, one extending direction of convex shapes may intersect the other extending direction of convex shapes at an angle other than the orthogonal angle.

(6) In the above-described second embodiment, an example has been described where, in the optical sheet 220, the extending direction of the convex shapes 221a is the x direction inclined by 45 degrees with respect to the horizontal direction (X direction), the extending direction of the convex shapes 223a is the z direction inclined by 45 degrees with respect to the vertical direction (Z direction), and the two extending directions are orthogonal to each other. However, the invention is not limited thereto. The extending directions of the convex shapes of the optical sheet 220 may be a direction inclined by an angle other than 45 degrees, for example, 15 degrees or 30 degrees with respect to the horizontal direction or the vertical direction, or the extending directions of the convex shapes may be appropriately set depending on the arrangement of the pixels of the image source 11 or the like. In this manner, by setting the inclined direction, it may be possible to prevent the light of the adjacent pixel regions of the image source diffused by the optical sheet from mixing with each other between the pixel regions to be conspicuous light of a color different from the original color.

In addition, one extending direction of convex shapes may intersect the other extending direction of convex shapes at an angle other than the orthogonal angle.

(7) In each of the above embodiments, an example has been described where, in the optical sheet 20, the refractive indexes of the first optical layer 21 and the third optical layer 23 are higher than the refractive index of the second optical layer 22, but the invention is not limited thereto. For example, the refractive indexes of the first optical layer 21 and the third optical layer 23 may be lower than the refractive index of the second optical layer 22.

(8) In each of the above-described embodiments, an example has been described where the second optical layer 22 is a layer made of a UV curable resin, but the invention is not limited thereto. For example, the second optical layer 22 may be made of an adhesive material having light transmittance to bond the first optical layer 21 and the third optical layer 23. In this case, the refractive index of the adhesive material constituting the second optical layer 22 may need to be set so that a difference in refractive index is in a range of 0.005 or more and 0.1 or less with respect to the refractive indexes of the first optical layer 21 and the third optical layer 23.

(9) In the above-described first embodiment, an example has been described where the reflection suppressing layer is provided on the front surface and/or the back surface of the optical sheet 20. A similar reflection suppressing layer may be provided on the optical sheet 220 according to the second embodiment and the optical sheet 320 according to the third embodiment.

In the first embodiment described above, an example has been described where the distance between the optical sheet 20 and the eye E of the viewer in the Y direction is 100 times or more the arrangement pitch of the pixel regions of the image source 11. The distance between the optical sheet and the eye of the viewer in the Y direction may also be set to 100 times or more the arrangement pitch of the pixel regions of the image source 11 in the second embodiment and the third embodiment.

EXPLANATION OF REFERENCE NUMERALS

1, 201, 301: display device
11: image source
12: lens
20, 220, 320: optical sheet
21, 221, 321: first optical layer
21*a*, 221*a*: convex shape
321*a*: unit shape
321*b*: flat portion
22, 222, 322: second optical layer
23, 223, 323: third optical layer
23*a*, 223*a*: convex shape
323*a*: unit shape
323*b*: flat portion E: eye of viewer

The invention claimed is:

1. A display device comprising:
an image source that emits image light from a plurality of arranged pixel regions;
a lens that enlarges and emits the image light to a viewer side; and
an optical sheet that is disposed between the image source and the lens or at the viewer side of the lens, wherein
the optical sheet has at least two or more optical layers, and a plurality of unit shapes are formed at each interface between the optical layers,
the unit shapes provided in the optical sheet are convex shapes,
a diffusion angle $\beta$ of the optical sheet at which luminance is $\frac{1}{20}$ of maximum luminance satisfies $\beta \leq 5/\alpha$, where $\alpha$ represents a half-value angle of the optical sheet.

2. The display device according to claim 1,
wherein, in the optical sheet,
a difference $\Delta n$ in refractive index between adjacent layers satisfies $0.005 \leq \Delta n \leq 0.1$, and
the half-value angle $\alpha$ satisfies $0.05° \leq \alpha \leq 0.2°$.

3. The display device according to claim 2,
wherein the convex shapes extend in a first direction in a sheet surface orthogonal to a thickness direction of the optical sheet and are arranged in a second direction intersecting the first direction in the sheet surface, and
a cross-sectional shape of each convex shape in a cross section parallel to the thickness direction of the optical sheet and parallel to the second direction is formed in a substantially arc shape.

4. The display device according to claim 3,
wherein the optical sheet has three or more optical layers, and extending directions in the sheet surface of the convex shapes provided at respective interfaces between adjacent optical layers intersect each other when viewed in the thickness direction of the optical sheet.

5. A display device comprising:
an image source that emits image light from a plurality of arranged pixel regions;
a lens that enlarges and emits the image light to a viewer side; and
an optical sheet that is disposed between the image source and the lens or at the viewer side of the lens, wherein
the optical sheet has at least two or more optical layers, and a plurality of unit shapes are formed at each interface between the optical layers,
wherein the unit shapes provided in the optical sheet are convex shapes, and
wherein, when an arrangement pitch of the pixel regions of the image source is denoted by d, and a distance from a display surface of the image source to a position of an eye of a viewer is denoted by D, a diffusion angle $\gamma$ of the optical sheet at which luminance is $\frac{1}{10}$ of maximum luminance satisfies: $\arctan(d/D) \leq \gamma \leq 3 \times \arctan(d/D)$.

6. The display device according to claim 5,
wherein the convex shapes extend in a first direction in a sheet surface orthogonal to a thickness direction of the optical sheet and are arranged in a second direction intersecting the first direction in the sheet surface, and
a cross-sectional shape of each convex shape in a cross section parallel to the thickness direction of the optical sheet and parallel to the second direction is formed in a substantially triangular shape.

7. The display device according to claim 6,
wherein the optical sheet has three or more optical layers, and an extending direction in the sheet surface of the convex shapes provided at interfaces between adjacent optical layers intersect each other when viewed in the thickness direction of the optical sheet.

8. The display device according to claim 5,
wherein each convex shape is formed in a substantially quadrangular pyramid shape arranged along a sheet surface orthogonal to the thickness direction of the optical sheet.

9. The display device according to claim 5,
wherein a difference Δn in refractive index between adjacent layers of the optical sheet satisfies 0.005≤Δn≤0.1.

10. The display device according to claim 6,
wherein a difference Δn in refractive index between adjacent layers of the optical sheet satisfies 0.005≤Δn≤0.1.

11. The display device according to claim 7,
wherein a difference Δn in refractive index between adjacent layers of the optical sheet satisfies 0.005≤Δn≤0.1.

12. The display device according to claim 8,
wherein a difference Δn in refractive index between adjacent layers of the optical sheet satisfies 0.005≤Δn≤0.1.

13. A display device comprising:
an image source that emits image light from a plurality of arranged pixel regions;
a lens that enlarges and emits the image light to a viewer side; and
an optical sheet that is disposed between the image source and the lens or at the viewer side of the lens, wherein the optical sheet has at least two or more optical layers, and a plurality of unit shapes are formed at each interface between the optical layers,
wherein an amount of transmitted light at a diffusion angle of the optical sheet which is −0.1° or more and 0.1° or less is 30% or more of a total amount of transmitted light passing through the optical sheet, and
wherein an amount of transmitted light at a diffusion angle of the optical sheet which is −0.3° or more and 0.3° or less is 95% or more of the total amount of transmitted light passing through the optical sheet.

14. The display device according to claim 13,
wherein an amount of transmitted light at a diffusion angle of the optical sheet which is 0.1° or more and 0.3° or less is 20% or more of the total amount of transmitted light passing through the optical sheet, and
wherein an amount of transmitted light at a diffusion angle of the optical sheet which is −0.3° or more and −0.1° or less is 20% or more of the total amount of transmitted light passing through the optical sheet.

15. The display device according to claim 13, wherein a difference Δn in refractive index between adjacent layers of the optical sheet satisfies 0.005≤Δn≤0.1.

16. The display device according to claim 14,
wherein a difference Δn in refractive index between adjacent layers of the optical sheet satisfies 0.005≤Δn≤0.1.

17. A display device comprising:
an image source that emits image light from a plurality of arranged pixel regions;
a lens that enlarges and emits the image light to a viewer side; and
an optical sheet that is disposed between the image source and the lens or at the viewer side of the lens, wherein the optical sheet has at least two or more optical layers, and a plurality of unit shapes are formed at each interface between the optical layers,
wherein an amount of transmitted light at a diffusion angle of the optical sheet which is −0.1° or more and 0.1° or less is 30% or more of a total amount of transmitted light passing through the optical sheet, and
wherein, when a pitch between adjacent pixels of the image source is denoted by d and a shortest distance from a light-emitting surface of the image light in the image source to an eye of a viewer is denoted by D,
an amount of transmitted light at a diffusion angle of the optical sheet which is $0.5 \times \sin^{-1}(d/D)$ or more and $5 \times \sin^{-1}(d/D)$ or less is 20% or more of the total amount of transmitted light passing through the optical sheet, and
an amount of transmitted light at a diffusion angle of the optical sheet which is $-5 \times \sin^{-1}(d/D)$ or more and $-0.5 \times \sin^{-1}(d/D)$ or less is 20% or more of the total amount of transmitted light passing through the optical sheet.

18. The display device according to claim 17,
wherein a difference Δn in refractive index between adjacent layers of the optical sheet satisfies 0.005≤Δn≤0.1.

\* \* \* \* \*